US012505810B2

(12) United States Patent
Kim

(10) Patent No.: US 12,505,810 B2
(45) Date of Patent: Dec. 23, 2025

(54) DATA DRIVING DEVICE, A DISPLAY DRIVING DEVICE, AND A DISPLAY DRIVING METHOD

(71) Applicant: LX SEMICON CO., LTD., Daejeon (KR)

(72) Inventor: Won Youn Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/471,754

(22) Filed: Sep. 21, 2023

(65) Prior Publication Data

US 2024/0105126 A1 Mar. 28, 2024

(30) Foreign Application Priority Data

Sep. 22, 2022 (KR) ........................ 10-2022-0119774

(51) Int. Cl.
*G09G 3/3283* (2016.01)
*G09G 3/3233* (2016.01)

(52) U.S. Cl.
CPC ......... *G09G 3/3283* (2013.01); *G09G 3/3233* (2013.01); *G09G 2300/0828* (2013.01); *G09G 2300/0852* (2013.01); *G09G 2310/0297* (2013.01); *G09G 2330/10* (2013.01)

(58) Field of Classification Search
CPC ............... G09G 3/3283; G09G 3/3233; G09G 2300/0828; G09G 2300/0852; G09G 2310/0297; G09G 2330/10; G09G 3/30–3291; G09G 2300/0413; G09G 2300/0809–0866; G09G 2300/088–0895; G09G 2330/08; G09G 3/006
See application file for complete search history.

(56) References Cited

U.S. PATENT DOCUMENTS

| | | | | |
|---|---|---|---|---|
| 9,468,050 | B1 * | 10/2016 | Rotzoll | G09G 3/3275 |
| 10,297,200 | B2 | 5/2019 | Kim et al. | |
| 2006/0023109 | A1 * | 2/2006 | Mabuchi | H04N 25/69 348/340 |
| 2008/0238833 | A1 | 10/2008 | Hioki et al. | |
| 2015/0154933 | A1 * | 6/2015 | Bae | G09G 3/3611 345/618 |
| 2017/0032738 | A1 * | 2/2017 | Lee | G09G 3/3233 |
| 2021/0088575 | A1 * | 3/2021 | Huang | G01R 31/2635 |
| 2021/0202673 | A1 | 7/2021 | Kim et al. | |
| 2021/0209979 | A1 * | 7/2021 | Gao | G09G 3/006 |

(Continued)

FOREIGN PATENT DOCUMENTS

| | | | |
|---|---|---|---|
| WO | 2007031704 | A1 | 3/2007 |
| WO | 2020233355 | A1 | 11/2020 |

OTHER PUBLICATIONS

Extended European Search Report dated Jan. 30, 2024, issued for the corresponding European patent application No. 23198419.6, 13 pages.

*Primary Examiner* — Roberto W Flores
(74) *Attorney, Agent, or Firm* — ROTHWELL, FIGG, ERNST & MANBECK, P.C.

(57) ABSTRACT

In the embodiment, the location of the defective pixel can be determined by measuring the operating current of each LED of the pixel, and the sub-LED can be driven in response to the location information of the defective pixel, thereby implementing normal LED operation even in a pixel defect situation.

11 Claims, 18 Drawing Sheets

(56) References Cited

U.S. PATENT DOCUMENTS

| | | | |
|---|---|---|---|
| 2022/0139300 A1 | 5/2022 | Yokoyama et al. | |
| 2022/0383799 A1 | 12/2022 | Liu et al. | |
| 2023/0215307 A1* | 7/2023 | Hwang ................ | G09G 3/3258<br>345/204 |

* cited by examiner

FIG. 14

| | | | | | | | | | | | |
|---|---|---|---|---|---|---|---|---|---|---|---|
| 0 | 0 | 0 | 0 | 0 | 0 | 0 | 0 | 0 | 0 | 0 | 0 |
| 255 | 255 | 255 | 255 | 255 | 255 | 255 | 255 | 255 | 255 | 255 | 255 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

Horizontal Scan

FIG. 15

| | | | | | | | | | | | |
|---|---|---|---|---|---|---|---|---|---|---|---|
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |
| 0 | 0 | 0 | 0 | 255 | 0 | 0 | 0 | 0 | 0 | 0 | 0 |

Vertical
Scan

DATA DRIVING DEVICE, A DISPLAY DRIVING DEVICE, AND A DISPLAY DRIVING METHOD

CROSS-REFERENCE TO RELATED APPLICATIONS

The present application claims priority to and the benefit of priority to Korean Patent Application No. 10-2022-0119774, filed on Sep. 22, 2022, which is incorporated herein by reference in its entirety.

TECHNICAL FIELD

An embodiment relates to a data driving device capable of driving the pixels of a panel, a display driving device, and a display driving method.

BACKGROUND

As informatization progresses, various display devices that can visualize information are being developed. The display devices that have been developed or are being developed recently comprise a liquid crystal display (LCD) device, an organic light emitting diode (OLED) display device, a plasma display panel (PDP) device, etc. These display devices are being developed to properly display high-resolution images.

However, the above-mentioned display devices have the advantage of high resolution, but have the disadvantage of being difficult to enlarge. For example, the large-scale OLED display device developed to date are at the level of the 80-inch (approximately 2 m) or the 100-inch (approximately 2.5 m), and are not suitable for making large display devices exceeding 10 m in width.

As a way to solve this problem of enlargement, interest in a light emitting diode (LED) display device has recently been increasing. In LED display device technology, modular LED pixels are arranged in the required number to form a large panel. Alternatively, according to LED display device technology, a large panel structure is formed by arranging a required number of unit panels composed of a plurality of LED pixels. In this way, in LED display device technology, it is possible to easily implement a large display device by arranging LED pixels as necessary and enlarging the size.

The LED display device has the advantage of not only enlarging but also diversifying panel sizes. In the LED display device technology, the horizontal and vertical sizes can be adjusted in various ways according to the appropriate arrangement of LED pixels.

Meanwhile, there can be several schemes to drive the display panel on which the LEDs are arranged. Representative driving schemes comprise a pulse amplitude modulation (PAM) scheme and a pulse width modulation (PWM) scheme. The PAM scheme supplies an analog voltage corresponding to the grayscale value of the pixel to the pixel, and controls the size of the current flowing to the pixel differently depending on the analog voltage. The PAM scheme has a problem in that it is difficult to implement low grayscale on the display panel where the LEDs are arranged. The PWM scheme adjusts the time of the current supplied to the pixel according to the gray level value of the pixel. In this active scheme, the pixel structure is complicated because a comparator circuit is provided within the pixel, and there is a problem of uneven accuracy depending on the offset of the comparator.

In addition, the display panel on which the LEDs are arranged had a problem in that if there was a defect in the LEDs or defective pixels during the transfer process, there is a problem of having to discard the display panel or perform a separate repair process.

In addition, there is a problem that a separate crack detection device is needed to detect cracks in the panel.

SUMMARY

Against this background, the purpose of the embodiment is to provide a technology for using a display panel without a separate repair process when there are defective LEDs and defective pixels during the transfer process.

In addition, the purpose of the embodiment is to provide a data driving device, a display driving device, and a display driving method that can be applied to wafer test equipment without separate optical equipment and can detect cracks in the panel without increasing the chip size.

To achieve the above-described object, according to one aspect of the embodiment, a data driving device, comprising: a line of a second driving voltage electrically connected to a pixel circuit; a voltage regulator configured to supply the second driving voltage to the pixel circuit through a line of the second driving voltage; and an analog-to-digital converter configured to receive an output current of the pixel circuit through the line of the second driving voltage.

To achieve the above-described object, according to another aspect of the embodiment, a display driving device, comprising: a pixel circuit comprising a first LED and a second LED; an analog-to-digital converter configured to receive an output signal of the pixel circuit through a line of a second driving voltage electrically connected to the pixel circuit and convert an analog signal into a digital signal; and first switch disposed between the line of the second driving voltage and the analog-to-digital converter and configured to selectively transmit the output signal of the pixel circuit.

To achieve the above-described object, according to another aspect of the embodiment, a display driving method, comprising: supplying a second driving voltage to a pixel circuit comprising a first LED and a second LED, and selectively sensing an output current of the pixel circuit through a line of the second driving voltage supplied with the second driving voltage; determining a defective pixel of the first LED based on a current level of an output current of the pixel circuit; and operating the second LED when the first LED is not operating.

As described above, according to the embodiment, if there are defects in the LEDs or defective pixels during the transfer process, the display panel can be used without a separate repair process.

According to an embodiment, panel crack detection can be performed through an existing data driving device without a separate panel crack detection device.

BRIEF DESCRIPTION OF THE DRAWINGS

FIG. 14 is a diagram illustrating a horizontal defective pixel scanning method according to an embodiment.

FIG. 15 is a diagram illustrating a vertical defective pixel scanning method according to an embodiment.

DETAILED DESCRIPTION

Figure 1:
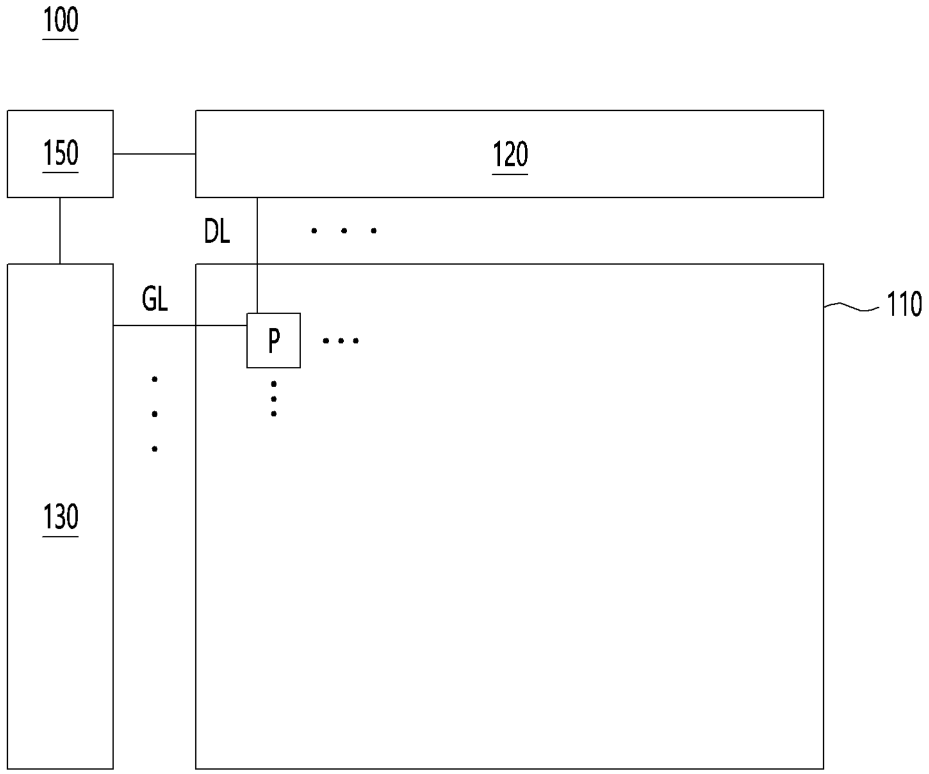
FIG. 1 is a configuration diagram of a display device according to an embodiment.

FIG. 1 is a configuration diagram of a display device according to an embodiment.

As shown in FIG. 1, the display device 100 according to an embodiment can perform a display function and a touch sensing function. The display device 100 can be implemented as a flat panel display such as a liquid crystal display (LCD) or an organic light emitting diode (OLED) display.

Referring to FIG. 1, the display device 100 can comprise a panel 110, a data driving device 120, a gate driving device 130, a touch sensing device 140, and a timing controller 150.

The panel 110 can be provided with a plurality of data lines DL connected to the data driving device 120 and a plurality of gate lines GL connected to the gate driving device 130. Additionally, a plurality of pixels P can be defined at intersections of a plurality of data lines DL and a plurality of gate lines GL in the panel 110. The pixel P can be defined by a pixel circuit inside the panel 110. Therefore, in the following description, the terms pixel P and pixel circuit can be used interchangeably.

At least two LEDs can be disposed in each pixel P. The two LEDs can be used, or one of the two LEDs can be selectively used using selection signals, as will be described later. Each pixel P can express a gray level value depending on the total amount of power or current supplied to the LED.

A plurality of transistors and at least one capacitor can be disposed in each pixel P. For example, eleven transistors and two capacitors can be disposed in each pixel P. The total amount of power or current supplied to the LED can be determined by the operation of these transistors and capacitors. An example of the circuit structure of each pixel P will be described later.

The panel 110 can comprise a display panel and a touch screen panel (TSP). Here, the display panel and the touch panel can share some components with each other. For example, a plurality of touch electrodes (TE) can be one component of a display panel (e.g., a common electrode for supplying a common voltage) and at the same time can be one component of a touch panel (a touch electrode for detecting a touch). Additionally, the panel 110 can be an in-cell type panel in which some components of the display panel and the touch panel are shared with each other, but is not limited thereto.

The data driving device 120 can receive a data control signal from the timing controller 150 and supply a data voltage to the data line DL to display an image in each pixel P of the panel 110.

The data driving device 120 can supply a data voltage to the pixel P to which the scan signal SCN is supplied. The data driving device 120 can receive image data and a data control signal from the timing controller 150, and check the grayscale value of each pixel P according to the image data. The data driving device 120 can generate a data voltage according to the grayscale value of each pixel P and supply the data voltage to the corresponding pixel P.

The data driving device 120 can drive the pixel P in a hybrid scheme that combines the PAM scheme and the PWM scheme. The data driving device 120 can determine the initial voltage of the data voltage according to the gray scale value of each pixel P and supply it to the pixel P, like the PAM scheme. The pixel P can express a grayscale value according to the LED on time in one control time like the PWM scheme. Here, the on-time of the LED can be determined by the initial voltage of the data voltage.

For this pixel driving scheme, at least one control signal can be supplied to each pixel P. This control signal can be supplied by the data driving device 120 or the gate driving device 130. Some of the transistors disposed in each pixel P can be turned on or off according to the control signal.

The gate driving device 130 can receive the gate control signal from the timing controller 150 and sequentially supply a scan signal to the gate line GL to turn on or turn off the transistor located in each pixel P.

The gate driving device 130 and the data driving device 120 can form one integrated circuit. Each of the gate driving device 130 and the data driving device 120 can form a separate integrated circuit.

The timing controller 150 can supply various control signals to the data driving device 120, the gate driving device 130, and the touch circuit (not shown). The timing controller 150 can transmit a data control signal that controls the data driving device 120 to supply a data voltage to each pixel P according to each timing, transmit a gate control signal to the gate driving device 130, or transmit a sensing signal to the touch circuit. The timing controller 150 can also perform other control functions.

One or more of the pixel circuit P, the data driving device 120, the gate driving device 130, and the timing controller 150 can form an integrated circuit, and the functions of each circuit can be integrated and implemented.

Figure 2:
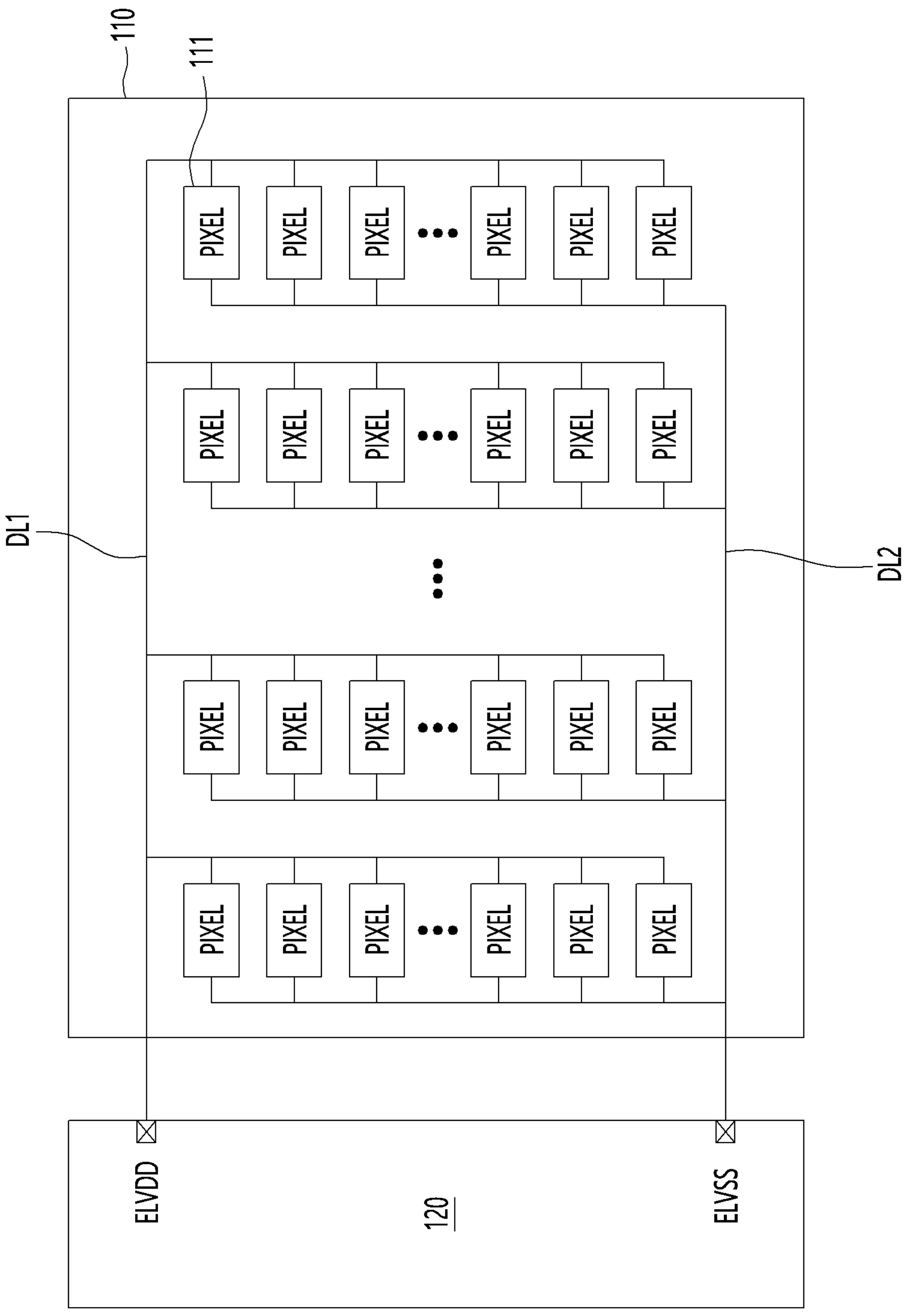
FIG. 2 is a configuration diagram of a panel according to an embodiment.

FIG. 2 is a configuration diagram of a panel according to an embodiment.

Referring to FIG. 2, the panel 110 can emit light by a plurality of LEDs included in a plurality of pixel circuits 111, respectively.

The data driving device 120 can adjust the brightness of the LED by supplying a first driving voltage ELVDD and a second driving voltage ELVSS to the pixel circuit 111 or a string of the pixel circuit 111. The first driving voltage ELVDD can be supplied by the first data line DL1, and the second driving voltage can be supplied by the second data line DL2. The first driving voltage ELVDD can be called a first potential voltage, and the second driving voltage ELVSS can be called a second potential voltage.

The data driving device 120 can sense an output voltage or output current of the pixel circuit 111 using the first data line DL1 or the second data line DL2. For example, in order to check the state of the panel 110, for example, the occurrence of a crack, a crack detection signal can be supplied to the panel and the occurrence of a crack can be sensed. In this case, the first data line DL1 or the second data line DL2 can be used as a sensing line.

Figure 3:
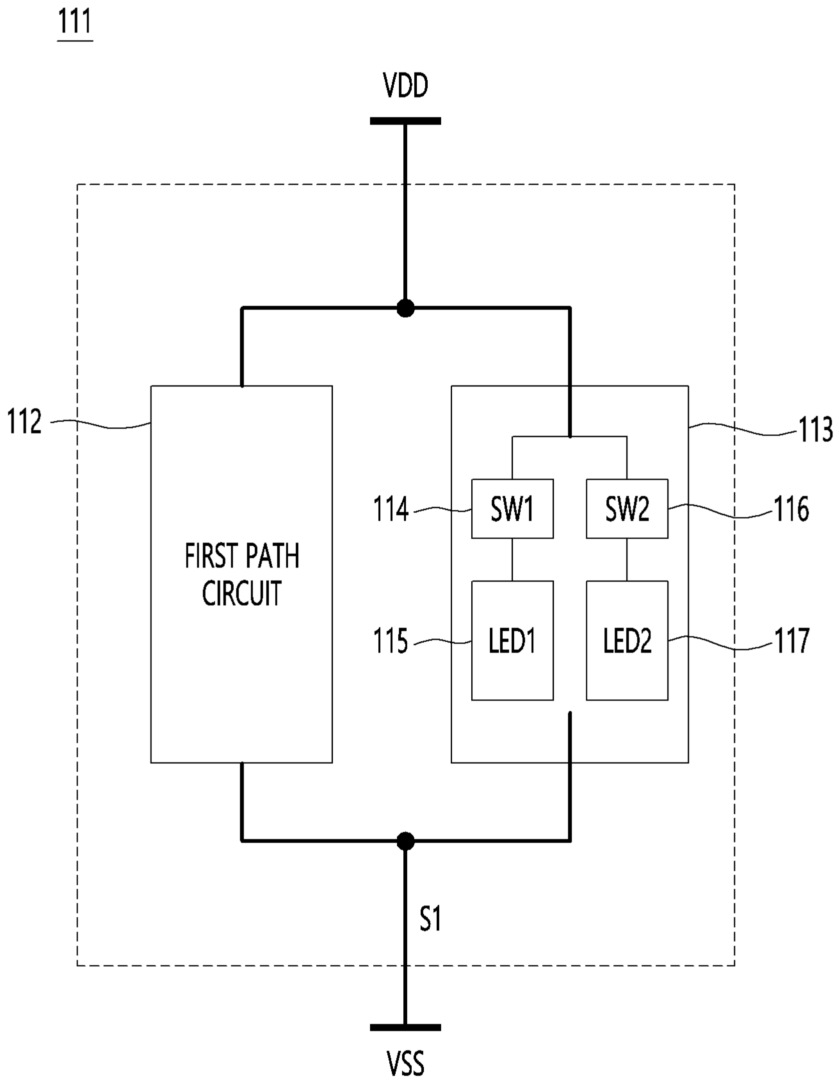
FIG. 3 is a first example diagram of a pixel circuit according to an embodiment.

FIG. 3 is a first example diagram of a pixel circuit according to an embodiment.

Referring to FIG. 3, the pixel circuit 111 can comprise a first path circuit 112, a second path circuit 113, etc.

The first path circuit 112 can comprise a first transistor T1 and a second transistor T2 disposed between the first driving voltage VDD and the second driving voltage VSS. The first path circuit 112 can comprise the first transistor T1 that controls the supply of the first driving voltage VDD and the second transistor T2 that controls the supply of the second driving voltage VSS.

The second path circuit 113 can comprise a first switch 114, a first LED 115, a second switch 116, a second LED 117, etc. The first switch 114 and the first LED 115 can be connected in series to form a first group, and the second switch 116 and the second LED 117 can be connected in series to form a second group. The first group and the second group can be connected in parallel. The first group and the second group can operate individually to control the operation of the first LED 115 or the second LED 117.

The second path circuit 113 can operate the first LED 115 in a first time section and operate the second LED 117 in a second time section. In each time section, one LED can be selectively operated. The second path circuit 113 can drive the first LED 114 by the first LED control signal SEL1 and drive the second LED 117 by the second LED control signal SEL2. The first LED 115 and the second LED 117 can operate when the first LED control signal SEL1 and the second LED control signal SEL2 are in a high state, and may not operate when the first LED control signal SEL1 and the second LED control signal SEL2 are in a low state, but is not limited thereto.

A sensing line S1 can be connected to the output terminal of each of the first path circuit 112 and the second path circuit 113. That is, the sensing line S1 can be commonly connected to the output terminals of each of the first path circuit 112 and the second path circuit 113. A voltage or current signal that can determine whether the first LED 115 or the second LED 117 is open, short-circuited, or operating normally can be transmitted using the sensing line S1.

The data driving device 120 can determine that the first LED 115 of the pixel P is defective when the operating current of the pixel circuit 111 obtained through the sensing line S1 is out of the reference range, and supply a driving current to the second LED 117 without supplying a driving current to the first LED 115.

When the first LED 115 of the pixel circuit 111 is determined to be defective, the data driving device 120 can block the driving current flowing to the first LED 115 and supply current only to the second LED 117, and store the location information of the corresponding pixel P in a register, memory, OTP, etc. In this case, the data driving device 120 can continuously operate the second LED 117 without operating the first LED 115 even when supplying the data voltage to the pixel circuit 111 in the next frame, and calculate and store coordinate information of the point where the pixel P is defective.

Figure 4:
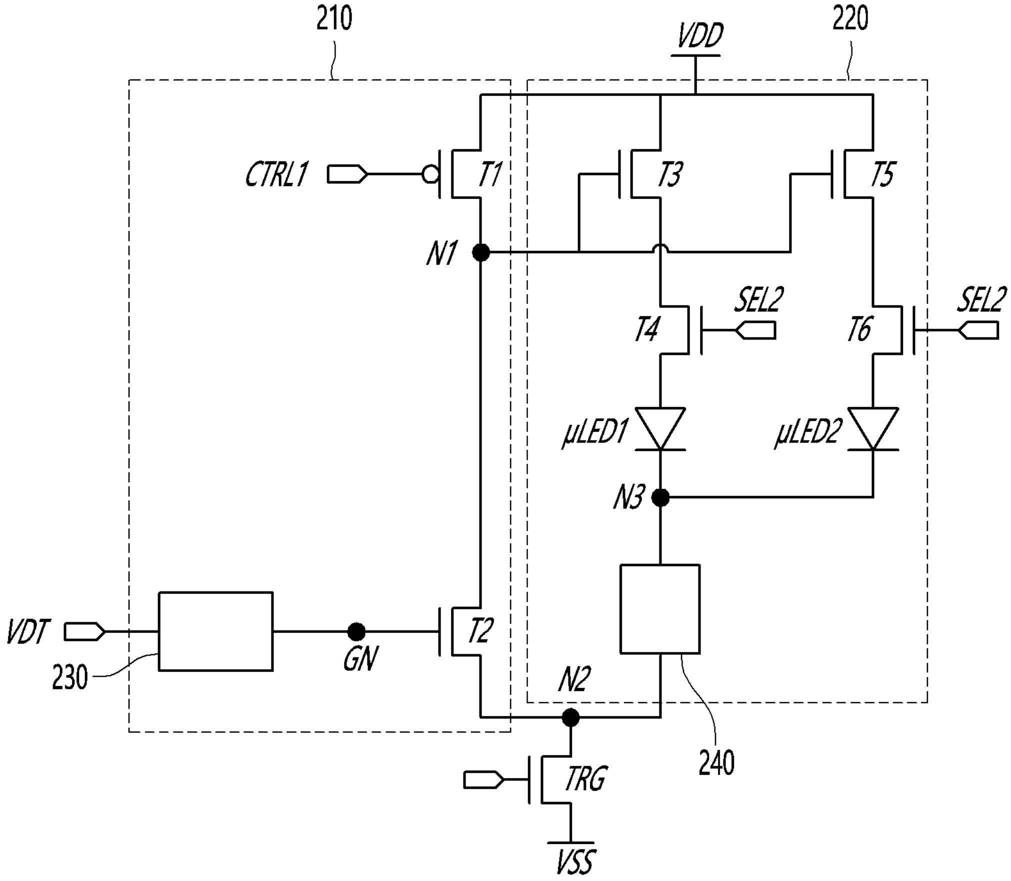
FIG. 4 is a second example diagram of a pixel circuit according to an embodiment.

The first switch 114 in FIG. 3 can correspond to the fourth transistor T4 in FIG. 4, and the second switch 116 can correspond to the sixth transistor T6 in FIG. 4, but are not limited thereto.

FIG. 4 is a second example diagram of a pixel circuit according to an embodiment.

Referring to FIG. 4, the pixel circuit can comprise a first path circuit 210, a second path circuit 220, a connection control transistor TRG, etc.

The first path circuit 210 can comprise a first transistor T1 and a second transistor T2 disposed in series between the first driving voltage VDD and the second driving voltage VSS. The first path circuit 210 can comprise a gate control circuit 230 that controls the gate terminal of the second transistor T2.

The first transistor T1 can be a P-type transistor, and one side thereof can be connected to the first driving voltage VDD and the other side thereof can be connected to the first node N1. The first control signal CTRL1 can be supplied to the gate terminal of the first transistor T1. The first control signal CTRL1 can be supplied by a data driving device or a gate driving device.

The first transistor T1 can control the supply of the first driving voltage VDD to the first node N1. When the first transistor T1 is turned on, the first driving voltage VDD can be supplied to the first node N1.

One side of the second transistor T2 can be connected to the first node N1, and the other side can be connected to the second node N2. One side of the connection control transistor TRG can be connected to the second node N2, and the other side can be connected to the second driving voltage VSS.

The second transistor T2 can control the supply of the second driving voltage VSS to the first node N1. When the connection control transistor TRG is turned on, the second driving voltage VSS can be supplied to the second node N2, and in this state, when the second transistor T2 is turned on, the second driving voltage VSS can be supplied to the first node N1.

In a state that the connection control transistor TRG is turned on, when the first transistor T1 is turned on, the first driving voltage VDD can be formed at the first node N1, and when the second transistor T2 is turned on, the second driving voltage VSS can be formed at the node N1.

The second path circuit 220 can comprise a third transistor T3 and a fourth transistor T4 arranged in series between the first driving voltage VDD and the second driving voltage VSS, a first LED uLED1, a second LED uLED2, etc. The second path circuit 220 can comprise a third transistor T3, a fourth transistor T4, the first LED uLED1, a fifth transistor T5 and a sixth transistor T6 arranged in parallel therewith, and the second LED uLED2. The second path circuit 220 can select only one of the fourth transistor T4 and the sixth transistor T6 by the first selection signal SEL1 and the second selection signal SEL2, and emit light from only one of the first LED uLED1 and the second LEDs uLED2.

The second path circuit 220 can comprise a current control circuit 240 that controls the size of the driving current ILED1 or ILED2 flowing to one of the first LED uLED1 and the second LED uLED2. The first driving current ILED1 can flow in the first LED uLED1, and the second driving current ILED2 can flow in the second LED uLED2.

One side of the third transistor T3 can be connected to a line of the first driving voltage VDD, and the other side can be connected to one side of the fourth transistor T4. The gate terminal of the third transistor T3 can be connected to the first node N1.

One side of the fourth transistor T4 can be connected to the third transistor T3 and the other side can be connected to the first LED uLED1. The gate terminal of the fourth transistor T4 can be connected to the first selection line to receive the first selection signal SELL The anode of the first LED uLED1 can be connected to the other side of the fourth transistor T3, and the cathode of the first LED uLED1 can be connected to the second node N2.

One side of the fifth transistor T5 can be connected to the line of the first driving voltage VDD, and the other side can be connected to one side of the sixth transistor T6. The gate terminal of the fifth transistor T5 can be connected to the first node N1.

One side of the sixth transistor T6 can be connected to the fifth transistor T5 and the other side can be connected to the second LED uLED2. The gate terminal of the sixth transistor T6 can be connected to the second selection line to receive the second selection signal SEL2.

The anode of the second LED uLED1 can be connected to the other side of the sixth transistor T6, and the cathode of the second LED uLED1 can be connected to the second node N2.

According to the embodiment, the current control circuit 240 can be connected between the cathode of the first LED uLED1 and the second node N2 and between the cathode of the second LED uLED2 and the second node N2.

Here, the pixel P or the pixel circuit can be formed on a silicon backplane. The transistors T1, T2, T3 and TRG provided in the pixel P can be formed as a CMOS (Complementary Metal-Oxide-Silicon) type, but is not limited thereto.

Looking at the operation of each component, when the first driving voltage VDD is formed at the first node N1, one of the third transistor T3 and the fifth transistor T5 can be turned on. Thus, the first driving current ILED1 and the second driving current ILED2 can be supplied to one of the first LED uLED1 and the second LED uLED2. When the second driving voltage VSS is formed at the first node N1, one of the turned-on third transistor T3 and fifth transistor T5 is turned off. Thus, the first LED uLED1 and the second LED One of uLED2 can also be turned off. The first driving voltage VDD can be greater than the second driving voltage VSS.

The voltage of the first node N1 can be determined depending on the on/off state of the first transistor T1 and the second transistor T2.

The gate voltage of the first transistor T1 can be determined by the first control signal CTRL1. The on/off of the first transistor T1 can be determined according to the first control signal CTRL1.

The gate voltage of the second transistor T2 can be determined by the voltage of the gate node GN. A ramp voltage that increases or decreases over time can be supplied to the gate node GN. The starting voltage of this lamp voltage can be determined according to the gray level value of the pixel P.

The gate node GN can be connected to a data line (DL in FIG. 1). The voltage of the gate node GN can be determined according to the data voltage supplied through the data line DL. A gate control circuit 230 can be disposed between the gate node GN and the data line DL.

Hereinafter, when a defect occurs in the second LED uLED2 and it cannot be used or cannot be used properly, the fourth transistor T4 among the fourth transistor T4 and the sixth transistor T6 can be selected by the first selection signal SEL1 and the second selection signal SEL2. Accordingly, the first LED uLED1 can be used as a light emitting device.

Conversely, when a defect occurs in the first LED uLED1 and it cannot be used or cannot be used properly, the sixth transistor T6 among the fourth transistor T4 and the sixth transistor T6 can be selected by the first selection signal SEL1 and the second selection signal SEL2. Accordingly, the second LED uLED2 can be used as a light emitting device.

Figure 5:
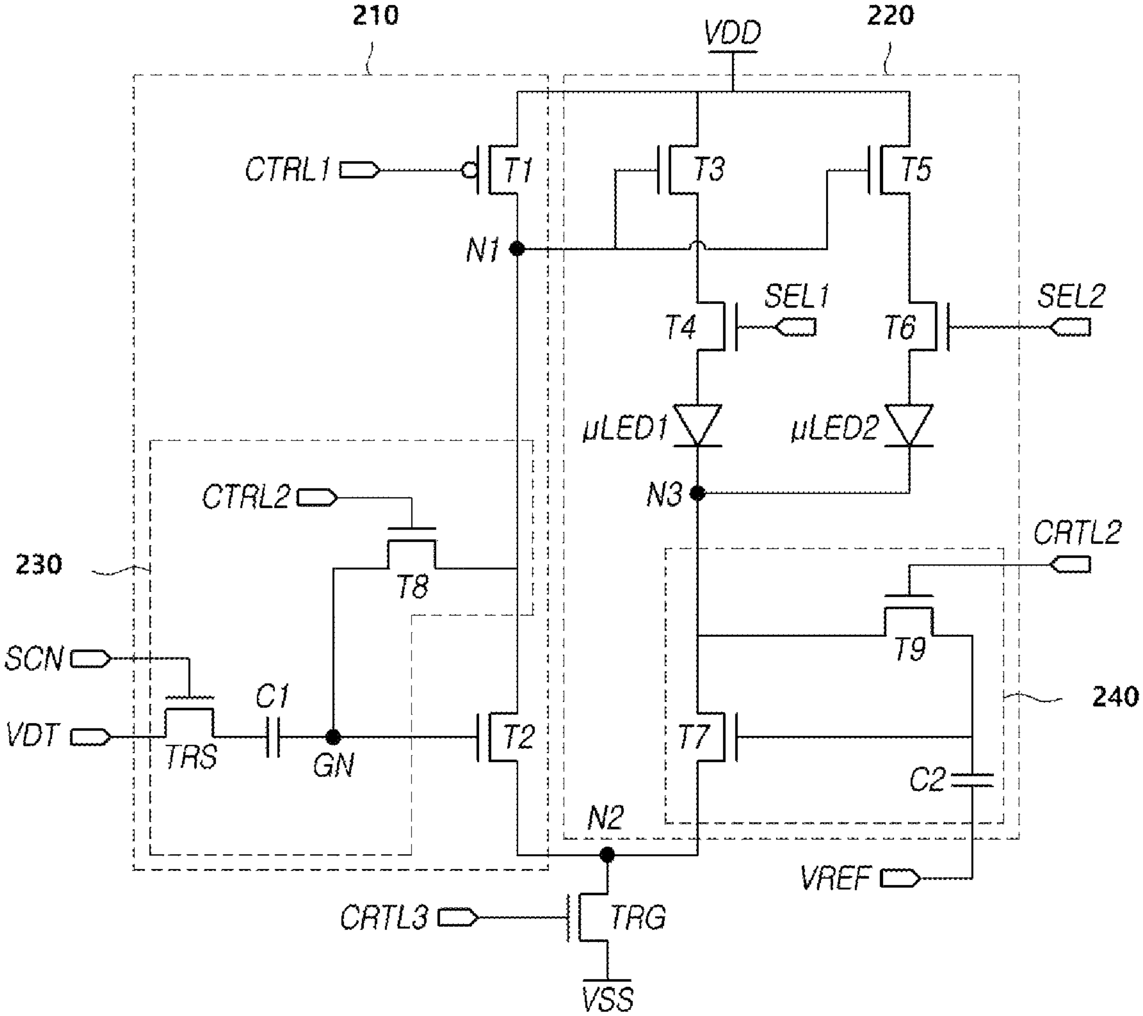
FIG. 5 is a third example diagram of a pixel circuit according to an embodiment.

FIG. 5 is a third example diagram of a pixel circuit according to an embodiment.

Referring to FIG. 5, the pixel circuit can comprise a first path circuit 210, a second path circuit 220, and a connection control transistor TRG. FIG. 5 can be an example of the circuit configuration of FIG. 4.

The first path circuit 210 can comprise a first transistor T1 that controls the supply of the first driving voltage VDD to the first node N1 and a second transistor T2 that controls the supply of the second driving voltage VSS to the first node N1.

The second path circuit 220 can comprise third to seventh transistors T3 to T7, a first LED uLED1, and a second LED uLED2. The third transistor T3 can control the supply of the first driving voltage VDD to the anode of the first LED uLED1. The fourth transistor T4 can be disposed between the first LED uLED1 and the third transistor T3. The fifth transistor T5 can control the supply of the first driving voltage VDD to the anode of the second LED uLED2 arranged in parallel with the first LED uLED1. The sixth transistor T6 can be disposed between the second LED uLED2 and the fifth transistor T5. The seventh transistor T7 can control the supply of the second driving voltage VSS to the cathodes of the first LED uLED1 and the second LED uLED2.

The second path circuit 220 can select only one of the fourth transistor T4 and the sixth transistor T6 by the first selection signal SEL1 and the second selection signal SEL2, and emit light from only one of the first LED uLED1 and the second LED uLED2.

The gate terminal of the third transistor T3 can be connected to the first node N1, and the other end can be connected to one side of the fourth transistor T4. When the first driving voltage VDD can be formed at the first node N1, the third transistor T3 can be turned on. With the third transistor T3 turned on, when the fourth transistor T4 is selected by the first selection signal SEL1 and the second selection signal SEL2, and the second driving voltage VSS is supplied to the cathode of the first LED uLED1, the first LED uLED1 can emit light.

The gate terminal of the fifth transistor T5 can be connected to the first node N1, and the other end can be connected to one side of the sixth transistor T6. When the first driving voltage VDD is formed at the first node N1, the fifth transistor T5 can be turned on. With the fifth transistor T5 turned on, when the sixth transistor T6 is selected by the first selection signal SEL1 and the second selection signal SEL2, and the second driving voltage VSS is supplied to the cathode of the first LED uLED1, the second LED uLED2 can emit light.

A lamp voltage that increases or decreases over time can be supplied to the gate terminal of the second transistor T2 in a section where one of the first LED uLED1 or the second LED uLED2 emits light. The starting voltage of this lamp voltage can be determined according to the gray level value of the pixel P.

One side of the connection control transistor TRG can be connected to the second node N2, which is a contact point with the second transistor T2 and the seventh transistor T7, and the other side can be connected to a line of the second driving voltage VSS.

The first path circuit 210 can comprise a gate control circuit 230, and the second path circuit 220 can comprise a current control circuit 240.

The gate control circuit 230 can comprise an eighth transistor T8 that controls the connection between the gate terminal and drain terminal of the second transistor T2. When the connection control transistor TRG is turned off, the first transistor T1 and the eighth transistor T8 can be turned on, and the gate-source voltage of the second transistor can become equal to the threshold voltage of the second transistor T2.

The gate control circuit 230 can comprise a first capacitor C1 disposed between the gate terminal of the second transistor T2 and the data line DL. A threshold voltage can be written to the gate-source of the second transistor T2, and an initial voltage can be written to one side of the first capacitor C1—the side connected to the data line DL. The first capacitor C1 can maintain both voltages (initial voltage–gate voltage) formed in this way. The gate voltage can be the threshold voltage.

The current control circuit 240 can comprise a ninth transistor T9 that controls the connection between the gate terminal and the drain terminal of the seventh transistor T7. When the connection control transistor TRG is turned off, the third transistor T3 and the ninth transistor T9 can be turned on, and the gate-source voltage of the seventh transistor T7 can become equal to the threshold voltage of the seventh transistor T7.

The current control circuit 240 can comprise a second capacitor C2 on one side of which is connected to the gate terminal of the seventh transistor T7. After the threshold voltage is written to the gate-source of the seventh transistor T7, the reference voltage VREF can be input to the other side of the second capacitor C2.

Depending on the voltage level of this reference voltage (VREF), the size of the first driving current ILED1 of the first LED uLED1 or the second driving current ILED2 of the second LED uLED2 can be controlled.

In the first path circuit 410, one side of the first transistor T1 can be connected to the line of the first driving voltage VDD and the other side can be connected to the first node N1.

One side of the second transistor T2 can be connected to the first node N1 and the other side can be connected to the second node N2. One side of the eighth transistor T8 can be connected to the drain terminal of the second transistor T2, and the other side can be connected to the gate terminal of the second transistor T2. One side of the first capacitor C1 can be connected to the gate terminal of the second transistor T2, and the other side can be connected to one side of the scan transistor TRS. The other side of the scan transistor TRS can be connected to the data line DL.

In the second path circuit 220, one side of the third transistor T3 can be connected to the first driving voltage VDD, and the other side can be connected to one side of the fourth transistor T4.

One side of the fourth transistor T4 can be connected to the third transistor T3 and the other side can be connected to the first LED uLED1. The gate terminal of the fourth transistor T4 is connected to the first selection line to receive the first selection signal SELL The anode of the first LED uLED1 can be connected to the other side of the fourth transistor T3, and the cathode of the first LED uLED1 can be connected to the second node N2.

One side of the fifth transistor T5 can be connected to the first driving voltage VDD, and the other side can be connected to one side of the sixth transistor T6. The gate terminal of the fifth transistor T5 can be connected to the first node N1.

One side of the sixth transistor T6 can be connected to the fifth transistor T5 and the other side can be connected to the second LED uLED2. The gate terminal of the sixth transistor T6 can be connected to the second selection line to receive the second selection signal SEL2.

The anode of the second LED uLED1 can be connected to the other side of the sixth transistor T6, and the cathode of the second LED uLED1 can be connected to the second node N2.

One side of the seventh transistor T7 can be connected to the cathode of the first LED uLED1 and the cathode of the second LED uLED2, and the other side can be connected to the second node N2. One side of the ninth transistor T9 can be connected to the drain terminal of the seventh transistor T7, and the other side can be connected to the gate terminal of the seventh transistor T7. One side of the second capacitor C2 can be connected to the gate terminal of the seventh transistor T7, and the other side can be connected to a line of the reference voltage VREF.

The first control signal CTRL1 can be supplied to the gate terminal of the first transistor T1, the second control signal CTRL2 can be supplied to the eighth transistor T8 and the ninth transistor T9, and the third control signal CTRL3 can be supplied to the connection control transistor TRG. A scan signal SCN can be supplied to the scan transistor TRS.

If a defect occurs in the second LED uLED2 and it cannot be used or cannot be used properly, the fourth transistor T4 among the fourth transistor T4 and the sixth transistor T6 can be selected by the first selection signal SEL1 and the second selection signal SEL2. Accordingly, the first LED uLED1 can be used as a light emitting device.

Conversely, when a defect occurs in the first LED uLED1 and it cannot be used or cannot be used properly, the sixth transistor T6 among the fourth transistor T4 and the sixth transistor T6 can be selected by the first selection signal SEL1 and the second selection signal SEL2. Accordingly, the second LED uLED2 can be used as a light emitting device.

Figure 6:
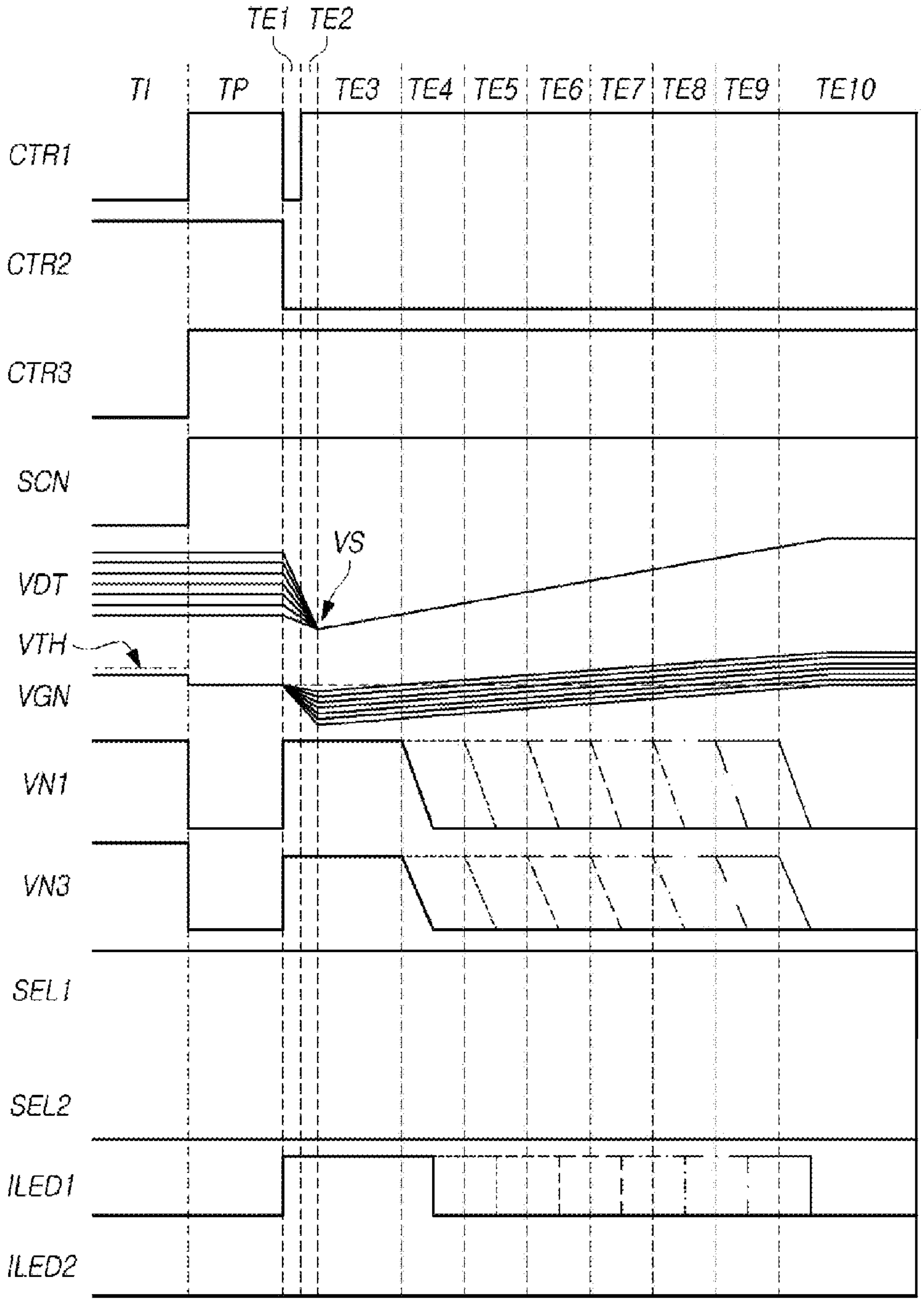
FIG. 6 is a waveform diagram of main signals, voltages, and currents of a pixel circuit according to an embodiment when a first LED is used.

FIG. 6 is a waveform diagram of main signals, voltages, and currents of a pixel circuit according to an embodiment when a first LED is used.

Referring to FIGS. 5 and 6, the control time of the pixel circuit can be divided into initialization time TI, program time TP, and emission control time TE1 to TE10. Here, the control time of the pixel circuit can be equal to the time of one frame or can be equal to one horizontal (1H) time.

During the initialization time TI, program time TP, and light emission control time TE1 to TE10, the first selection signal SELL can be supplied to the gate terminal of the fourth transistor T4 as a turn-on signal, and the second selection signal SEL2 can be supplied as a turn-off signal to the gate terminal of the sixth transistor T6 as a turn-off signal. Accordingly, the fourth transistor T4 can be turned on to select the third transistor T3 and the first LED uLED1. The sixth transistor T6 can be turned off such that the fifth transistor T5 and the second LED uLED2 are not selected and there is no effect on the subsequent operation of the pixel circuit.

As described above, during the initialization time TI, program time TP, and light emission control time TE1 to TE10, the first selection signal SELL can be supplied to the gate terminal of the fourth transistor as a turn-on signal. Instead, the first selection signal SELL can be supplied to the gate terminal of the fourth transistor as a turn-on signal only during the initialization time TI and the emission control time TE1 to TE10.

The initialization time TI can be the time to initialize the voltage of the terminals of each node and each transistor, and various schemes can be applied. These schemes are explained in more detail in the examples below.

The program time TP can be the time to write a specific voltage to main nodes and main transistors.

At the program time TP of the first example, the first control signal CTRL1 can turn off the first transistor T1 while generating a high voltage. Although not shown, the connection control transistor TRG can be turned on to form a second driving voltage VSS at the second node N2. Here, the second driving voltage VSS can be a ground voltage, but is not limited thereto.

As the second transistor T1 is turned on at the program time TP, the voltage VN1 of the first node N1 can become a low voltage. At this time, the gate voltage VGN of the second transistor T2 can be equal to the threshold voltage VTH of the second transistor T2. In other words, the second transistor T2 can be turned on at the program time TP, but virtually no current can flow through the drain-source of the second transistor T2.

At the program time TP, as the voltage VN1 of the first node N1 becomes low, the third transistor T3 can be turned off and the driving current ILED1 of the first LED uLED1 can become OA. The fifth transistor T5 can be also turned off and the driving current ILED1 of the second LED uLED1 can become OA.

At program time TP, the data voltage can be the initial voltage.

The pixel driving device can determine the initial voltage according to the grayscale value of the pixel, set the data voltage as the initial voltage, and supply it to the data line. The pixel driving device can be a data processing device, a timing controller (150 in FIG. 1), a data driving device 120, or another device.

The initial voltage supplied to the data line can be written to the gate control circuit 230. An initial voltage can be written on one side of the gate control circuit 230, and a gate voltage VGN can be written on the other side, and the gate control circuit 230 can maintain both voltages (initial voltage–gate voltage) in subsequent control times.

The emission control time can be divided into a plurality of sub-times TE1 to TE10.

In the first sub-time TE1 and the second sub-time TE2 among the plurality of sub-times TE1 to TE10, the pixel driving device can change the data voltage (VDT) to a preset constant voltage VS.

Since the gate control circuit 230 disposed between the data line and the gate node (GN) maintains both voltages (initial voltage–gate voltage), a change in the data voltage can cause a change in the gate voltage VGN. Due to this change, the gate voltage VGN can fall below the threshold voltage VTH, and the second transistor T2 can be turned off.

Meanwhile, in the first sub-time TE1, the first transistor T1 can be turned on according to the first control signal CTRL1, and the voltage VN1 of the first node can become the first driving voltage VDD. The third transistor T3 can be turned on according to the voltage VN1 of the first node, and the first driving current ILED1 can flow to the first LED uLED1, causing the first LED uLED1 to emit light.

Light emission of the first LED uLED1 can continue until the gate voltage VGN is maintained at a voltage lower than the threshold voltage VTH.

The pixel driving device can increase or decrease the data voltage at a constant slope at a constant voltage VS starting from the third sub-time TE3. As the data voltage increases or decreases, the gate voltage VGN can change, and as the gate voltage VGN becomes greater than the threshold voltage VTH, the first LED uLED1 can be turned off. That is, when the gate voltage VGN becomes greater than the threshold voltage VTH, the second transistor T2 can be turned on to form the second driving voltage VSS at the first node N1. The third transistor T3 can be turned off by the second driving voltage VSS on the first node N1, thereby stopping the first LED uLED1 from emitting light.

From the third sub-time TE3, the gate voltage VGN can take the form of a ramp voltage that increases or decreases at a constant slope. At this time, the starting voltage of the lamp voltage can be determined according to the initial voltage supplied to the data line at the program time TP.

Since the gate control circuit 230 maintains both voltages (initial voltage–gate voltage), the gate voltage VGN can change as the data voltage changes from the initial voltage to the constant voltage VS, which is the starting voltage of the ramp voltage.

Figure 7:
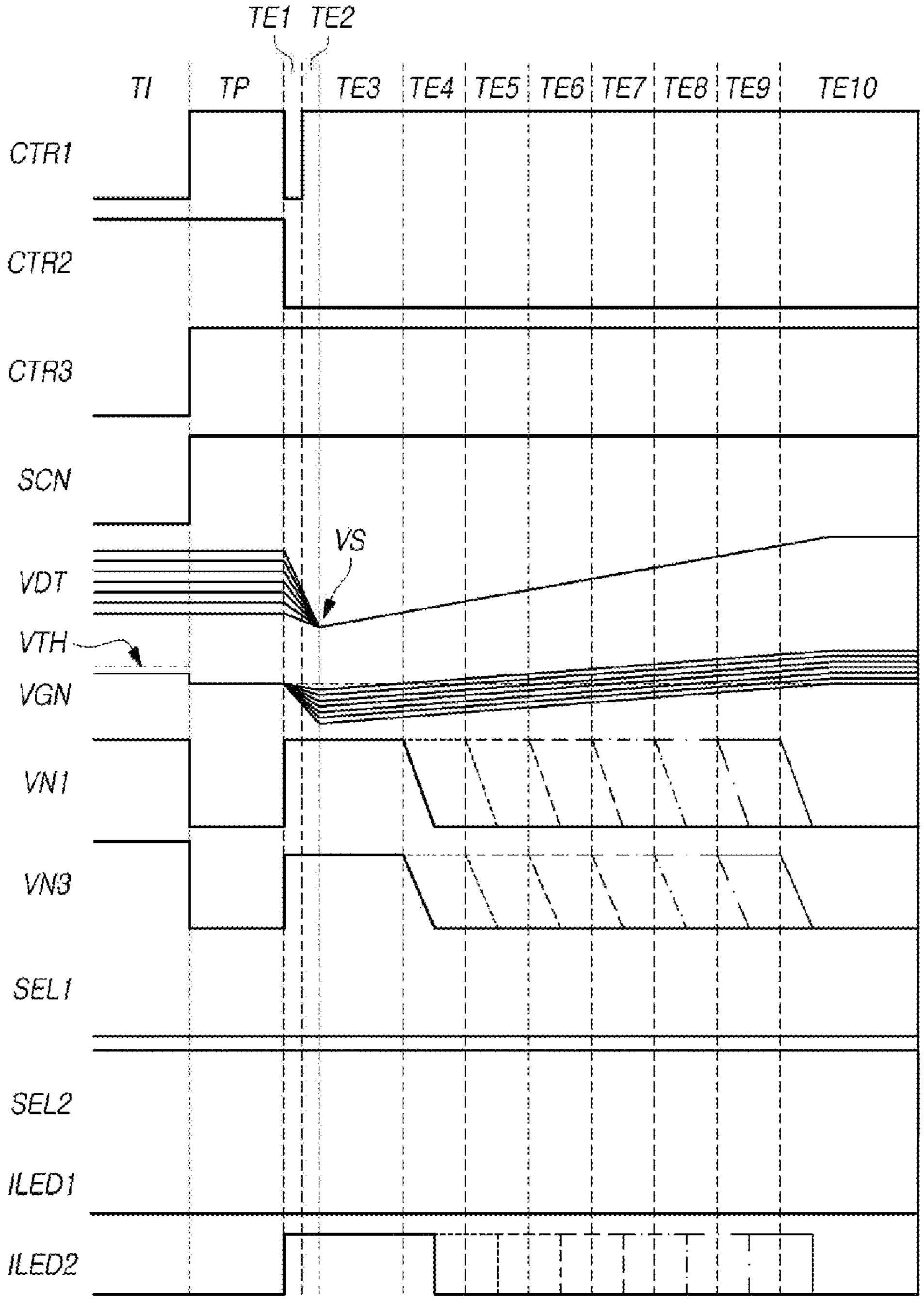
FIG. 7 is a waveform diagram of main signals, voltages, and currents of a pixel circuit according to an embodiment when a second LED is used.

FIG. 7 is a waveform diagram of main signals, voltages, and currents of a pixel circuit according to an embodiment when a second LED is used.

Referring to FIG. 7, the control time of the pixel P can be divided into initialization time TI, program time TP, and emission control time TE1 to TE10.

During the initialization time TI, program time TP, and light emission control time TE1 to TE10, the first selection signal SELL can be supplied to the gate terminal of the fourth transistor as a turn-off signal, and the second selection signal SEL2 can be supplied to the sixth transistor T6 as a turn-on signal. Accordingly, the fourth transistor T4 can be turned off and the third transistor T3 and the first LED uLED1 may not be selected, so that the subsequent operation of the pixel P may not be affected. The sixth transistor T6 can be turned on and the fifth transistor T5 and the second LED uLED2 can be selected.

The specific voltages on main nodes and main transistors at initialization time TI and program time TP can be the same as described with reference to FIG. 6.

However, as the voltage VN1 of the first node N1 becomes low at the program time TP, the fifth transistor T5 can be turned off and the driving current ILED1 of the second LED uLED1 can become OA.

At program time TP, the data voltage can be the initial voltage. The pixel driving device can determine the initial voltage according to the grayscale value of the pixel P, set the data voltage as the initial voltage, and supply it to the data line.

The initial voltage supplied to the data line can be written to the gate control circuit 230. An initial voltage can be written on one side of the gate control circuit 230, and a gate voltage VGN can be written on the other side, and the gate control circuit 230 can maintain both voltages (initial voltage–gate voltage) in subsequent control times.

The emission control time can be divided into a plurality of sub-times TE1 to TE10.

In the first sub-time TE1 and the second sub-time TE2 among the plurality of sub-times TE1 to TE10, the pixel driving device can change the data voltage to a preset constant voltage VS.

Meanwhile, in the first sub-time TE1, the first transistor T1 can be turned on according to the first control signal CTRL1, and the voltage VN1 of the first node can become the first driving voltage VDD. The fifth transistor T5 can be turned on according to the voltage VN1 of the first node, and the first driving current ILED1 can flow to the second LED uLED2, causing the second LED uLED2 to emit light.

Light emission of the second LED uLED1 can continue until the gate voltage VGN is maintained at a voltage lower than the threshold voltage VTH.

The pixel driving device can increase or decrease the data voltage at a constant slope at a constant voltage VS starting from the third sub-time TE3. As the data voltage increases or decreases, the gate voltage VGN can change, and as the gate voltage VGN can become greater than the threshold voltage VTH such that the second LED uLED2 can be turned off.

From the third sub-time TE3, the gate voltage VGN can take the form of a ramp voltage that increases or decreases at a constant slope. At this time, the starting voltage of the ramp voltage can be determined according to the initial voltage supplied to the data line at the program time TP.

Since the gate control circuit 230 maintains both voltages (initial voltage–gate voltage), the gate voltage VGN can change as the data voltage changes from the initial voltage to the constant voltage VS, which is the starting voltage of the ramp voltage.

The turn-on and turn-off of the pixel, that is, the first LED uLED1 or the second LED uLED2, can be a PWM scheme determined by comparison of the gate voltage VGN and the threshold voltage VTH. However, since the variable that determines the turn-on time of the PWM is the initial voltage of the data voltage, in this respect, one embodiment can be said to be a hybrid scheme that combines the PAM scheme and the PWM scheme.

In addition, when a defect occurs in the second LED uLED2 and it cannot be used or cannot be used properly, the fourth transistor T4 can be selected by the first selection signal SEL1 and the second selection signal SEL2, and the first LED uLED1 can be used.

Conversely, when a defect occurs in the first LED uLED1 and it cannot be used or cannot be used properly, the sixth transistor T6 can be selected by the first selection signal SEL1 and the second selection signal SEL2, and the second LED uLED2 can be used.

Therefore, if there are defects in the LEDs or defective pixels during the transfer process, the display panel can be used without a separate repair process.

Figure 8:
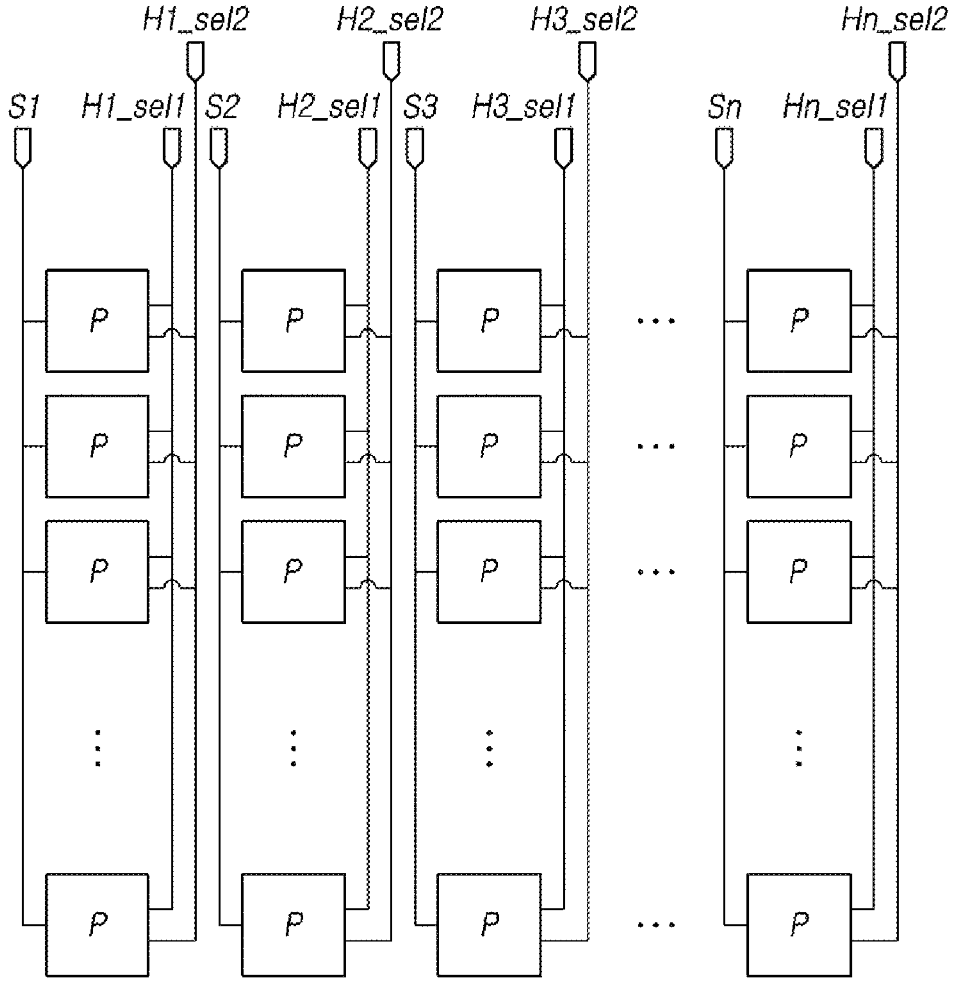
FIG. 8 is a first example diagram showing the arrangement of pixels according to an embodiment.

FIG. 8 is a first example diagram showing the arrangement of pixels according to an embodiment.

Referring to FIG. 8, the display panel can comprise a plurality of pixels P.

The plurality of pixels P can be arranged in a matrix with n pixels P in the first direction and m pixels P in the second direction (each of n and m are integers greater than 2).

The gate terminals of the scan transistors TRS of the m pixels arranged along the second direction can be electrically connected to one scan line that supplies the scan signal S1 to Sn. The gate terminals of the fourth transistors T4 of the m pixels P arranged along the second direction can be electrically connected to one first selection line supplying the first selection signal (one of H1-sel1 to Hn_sel1). The gate terminals of the sixth transistors T6 of the m pixels P arranged along the second direction can be electrically connected to one second selection line that supplies the second selection signal (one of H1-sel2 to Hn_sel2).

The first selection line and the second selection line can be connected to the gate driving device 130 of FIG. 1.

In the display panel, selection information for determining the first selection signal (one of H1-sel1 to Hn_sel1) and the second selection signal (one of H1-sel2 to Hn_sel2) can be stored in a memory (not shown). One of the first selection signal (one of H1-sel1 to Hn_sel1) and the second selection signal (H1-sel2 to Hn_sel2) can be transmitted to the fourth transistors T4 and the sixth transistors T6 of the pixels P through the gate driving device 130 based on the selection information.

Figure 9:
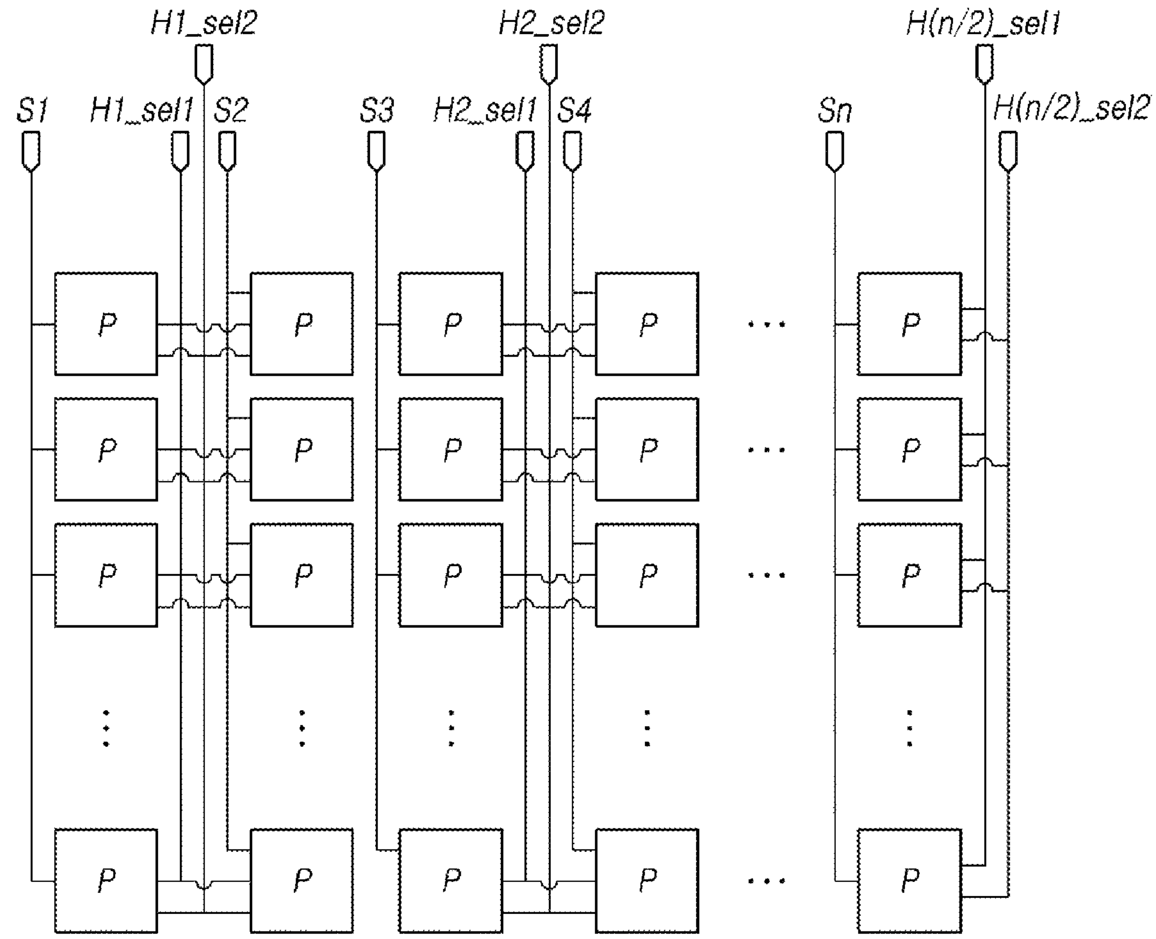
FIG. 9 is a second example diagram showing the arrangement of pixels according to an embodiment.

FIG. 9 is a second example diagram showing the arrangement of pixels according to an embodiment.

Referring to FIG. 9, the gate terminals of the fourth transistors T4 of two or more pixels P arranged along the first direction can be commonly electrically connected to one first selection line that supplies a first selection signal (one of H1-sel1 to Hn/2_sel1). The gate terminals of the sixth transistors T6 of two or more pixels P arranged along the first direction can be commonly electrically connected to one second selection line that supplies a second selection signal (one of H1-sel2 to Hn/2_sel2).

In FIG. 9, the gate terminals of the fourth transistor T4 and the sixth transistor T6 of two adjacent pixels P arranged along the first direction are shown as being electrically connected to the first selection line and the second selection line, but the gate terminals of the fourth transistor T4 and the sixth transistor T6 of two or three adjacent or non-adjacent pixels along the first direction can be electrically connected in common to the first selection line and the second selection line.

As described above, according to the embodiment, it is possible to easily implement low grayscale in the display panel on which the LEDs are disposed. According to the embodiment, the pixel can be driven using the PWM scheme without using a comparator. According to the embodiment, it is possible to use a hybrid pixel driving technology that combines the PAM scheme and the PWM scheme.

Figure 10:
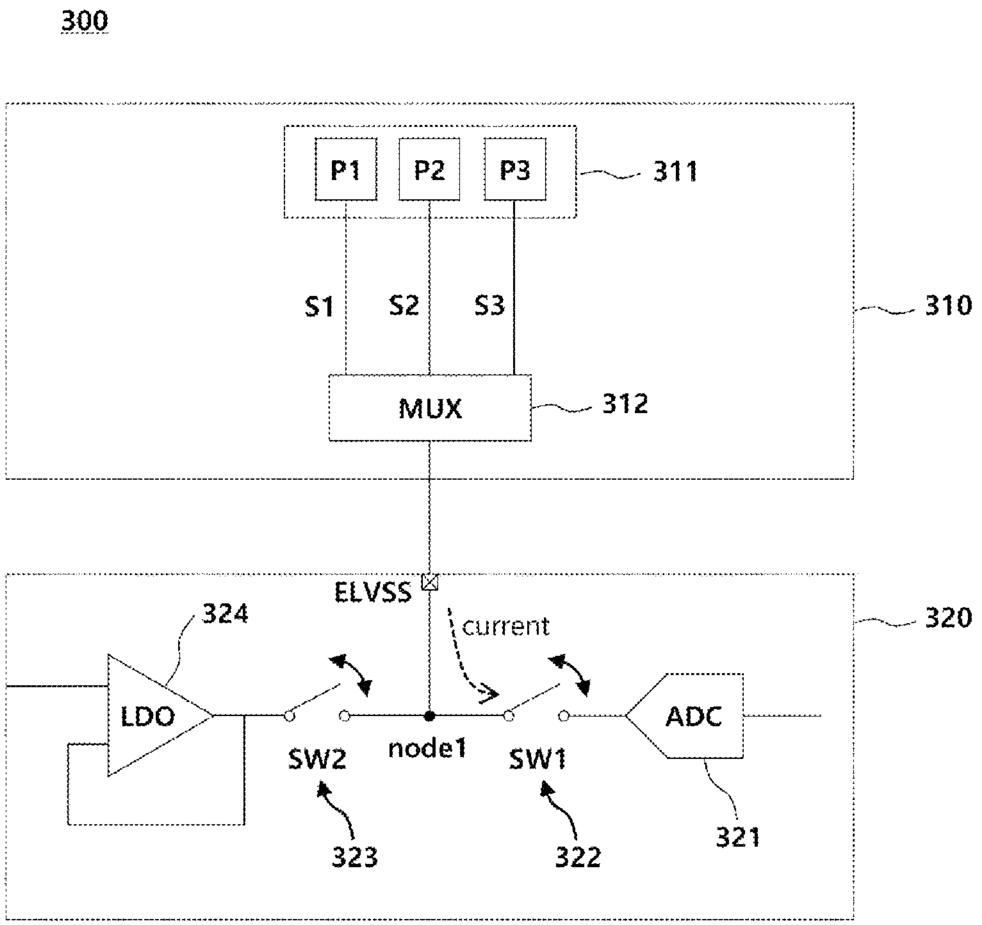
FIG. 10 is a first example configuration diagram of a data driving device according to an embodiment.

FIG. 10 is a first example configuration diagram of a data driving device according to an embodiment.

Referring to FIG. 10, the display device 300 can comprise a panel 310, a data driving device 320, etc. A circuit that comprises a pixel circuit and a data driving device 320 can be defined as a display driving device.

The panel 310 can comprise a plurality of pixel circuits 311 and a multiplexer 312 that selects and outputs output signals from the pixel circuits. In the drawing, a first pixel circuit P1, a second pixel circuit P2, and a third pixel circuit P3 are shown as the furnace circuit 311, but more pixel circuits can be provided.

A plurality of pixel circuits P1, P2 and P3 can be connected to sensing lines S1, S2 and S3 for sensing each output voltage or output current, and transmit it the multiplexer 312 and the data driving device 320.

The plurality of pixel circuits P1, P2 and P3 can comprise a first LED and a second LED for normal LED operation even in a pixel defect situation. The first LED can be the first LED uLED1 shown in FIG. 5, and the second LED can be the second LED uLED2 shown in FIG. 5.

Referring to FIGS. 5 and 10, the plurality of pixel circuits P1, P2 and P3 can comprise a first path circuit 210 and a second path circuit 220, respectively.

The first path circuit 210 can comprise a first transistor T1 and a second transistor T2 disposed between the first driving voltage VDD and the second driving voltage VSS.

The second path circuit 220 can comprise a third transistor T3, a fourth transistor T4 and a first LED uLED1 disposed between the first driving voltage VDD and the second driving voltage VSS, and a fifth transistor T5, a sixth transistor T6 and a second LED uLED2 disposed in parallel with the third transistor T3, the fourth transistor T4 and the first LED uLED1.

The plurality of pixel circuits P1, P2 and P3 can be electrically connected to the line of the second driving voltage VSS that supplies the second driving voltage VSS, receive the second driving voltage VSS from the data driving device 320 in the first time section, and transmit the output signal of the pixel circuit to the data driving device 320 in the second time section.

The line of the second driving voltage VSS electrically connected to the pixel circuit P1, P2 and P3 can be a terminal that performs the operation of transmitting the second driving voltage VSS and sensing the output signal of the pixel circuit for each time section through the same signal line.

The data driving device 320 can supply a first driving voltage VDD and a second driving voltage VSS to selectively emit light from the first LED uLED1 or the second LED uLED2 included in the pixel circuit P1, P2 and P3 and sense the output signals of the pixel circuits P1, P2 and P3. The data driving device 320 can sense signals output from the pixel circuits P1, P2 and P3 through the line of the second driving voltage ELVSS for transmitting the second driving voltage (ELVSS in FIG. 10).

The data driving device 320 can comprise a voltage regulator 324 that supplies a second driving voltage ELVSS through a line of the second driving voltage ELVSS, and an analog-to-digital converter 321 that receives the output current of the pixel circuit P1, P2 and P3).

The data driving device 320 can supply or stabilize the second driving voltage ELVSS built into the data driving device 320 instead of an external power source through the voltage regulator 324.

The data driving device 320 can be disposed between the analog-to-digital converter 321 and the line of the second driving voltage ELVSS and can comprise a first switch circuit 322 that is turned on in a first time section and turned off in a second time section.

The first switch circuit 322 can be turned off during the time section in which the second driving voltage is supplied to the pixel circuits P1, P2 and P3, and can be turned on during the time section in which the second driving voltage is not supplied to the pixel circuits P1, P2 and P3.

The data driving device 320 can be disposed between the voltage regulator 324 and the line of the second driving voltage ELVSS and can comprise a second switch circuit 323 that is turned off in a first time section and turned on in a second time section.

The second switch circuit 323 can be turned on during the time section in which the second driving voltage is supplied to the pixel circuits P1, P2 and P3, and can be turned off during the time section in which the driving voltage is not supplied to the pixel circuits P1, P2 and P3.

The first time section can be a time section for sensing the operating current of the pixel circuit 311, and the second time section can be a time section for supplying the second driving voltage ELVSS to the pixel circuit 311. The operation of each time section can be repeated or the order can be changed.

The first switch circuit 322 and the second switch circuit 323 can form a common node node1, and the common node can be connected to a line of the second driving voltage ELVSS. The common node node1 can be connected to the line of the second driving voltage ELVSS, and implement the supply of the second driving voltage ELVSS and the sensing operation of the output current of the pixel circuits P1, P2 and P3 through one circuit using alternate turn-on and turn-off driving of the first switch circuit 322 and the second switch circuit 323. The data driving device 320 can determine whether the pixel circuits P1, P2 and P3 are defective through sensing the output currents of the pixel circuits P1, P2 and P3. The data driving device 320 can scan the pixel circuits P1, P2 and P3 arranged on the panel 310 line by line and detect the location of the defective pixels by sensing the output current of the pixel circuits P1, P2 and P3.

According to the embodiment, the operating current of the cathode of each LED of the pixel can be measured, and the operating current of each LED of the pixel can be sensed while turning on the entire area of the panel 310 sequentially line by line. Through the sensing operation of the pixel circuit, a current higher than normal can be measured and judged as a short, or a current lower than normal can be measured and judged as open. Thus, the presence or absence of a defective pixel in the corresponding line of the panel 310 can be determined. In this process, the data driving device 320 can use the built-in analog-to-digital converter 321.

The data driving device 320 can comprise a multiplexer 312 that selects and outputs output currents of the pixel circuits P1, P2 and P3 or selects and outputs a crack test signal of the panel. The multiplexer 312 can be electrically connected to the input terminal of the analog-to-digital converter 321.

The multiplexer 312 can be disposed between a common node node1 and the first switch circuit 322, or can be disposed between the first switch circuit 322 and the analog-to-digital converter 321, but is not limited thereto.

The data driving device 320 can comprise a first sensing line that senses the operating current of the pixel circuits P1, P2 and P3 and a second sensing line that senses a crack test signal of the panel 310 on which the pixel circuits P1, P2 and P3 are arranged. The first sensing line can be a signal line connected between the line of the second driving voltage ELVSS and the analog-to-digital converter 321, and the second sensing line can be a signal line separated from the line of the second driving voltage ELVSS.

FIG. 10 illustrates signal sensing of the pixel circuits P1, P2 and P3 through the line of the second driving voltage ELVSS, but a method through the line of the first driving voltage can also be included as an example of the embodiment.

Figure 11:
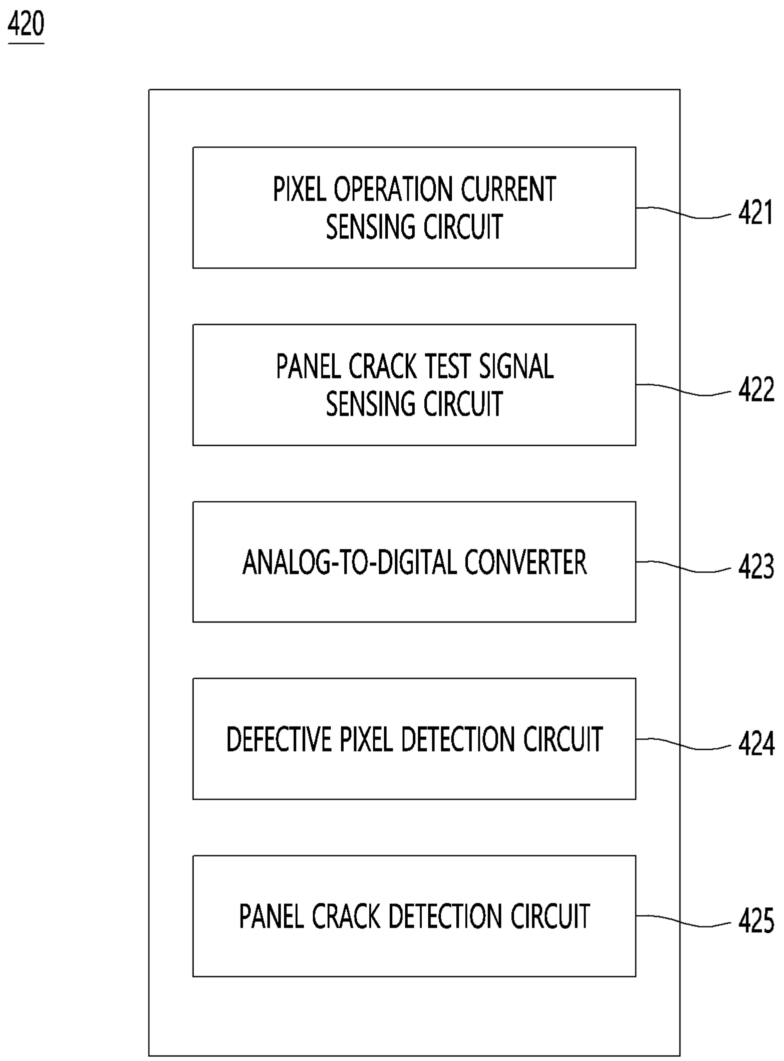
FIG. 11 is a second example configuration diagram of a data driving device according to an embodiment.

FIG. 11 is a second example configuration diagram of a data driving device according to an embodiment.

Referring to FIG. 11, the data driving device 420 can comprise a pixel operation current sensing circuit 421, a panel crack test signal sensing circuit 422, an analog-to-digital converter 423, a defective pixel detection circuit 424, and a panel crack detection circuit 425. The pixel operation current sensing circuit 421 and the panel crack test signal sensing circuit 422 can be called a first sensing circuit and a second sensing circuit, respectively, or vice versa.

The pixel operation current sensing circuit 421 can determine whether a pixel is defective and the location of the defective pixel by sensing a signal that is outside the normal operating range based on the output signal of the pixel circuit.

The panel crack test signal sensing circuit 422 can supply and sense a test signal to determine cracks in the panel.

The analog-to-digital converter 423 can convert an analog signal obtained by the pixel operation current sensing circuit 421 and the panel crack test signal sensing circuit 422 into a digital signal, and transmit the digital signal to a circuit for digital operation, for example, defective pixel detection circuit 424.

The defective pixel detection circuit 424 can scan the panel in units of vertical or horizontal lines to determine the presence or absence of defective pixels, the type of LED operating on the defective pixel, for example, the first LED, the second LED, and the location the defective pixel.

The defective pixel detection circuit 424 can transmit a control signal to the defective pixel whose location has been identified so that the second LED, which is preliminarily disposed, operates when the first LED does not operate. In this case, the location information of the defective pixel can be stored in OTP, memory, register, etc.

The defective pixel detection circuit 424 can change the settings to operate the second LED instead of the first LED and then perform pixel sensing again on the line comprising the repaired pixel circuit to verify whether the line has been repaired. Through this process, LED operation can be performed stably in the pixel.

The panel crack detection circuit 425 can transmit and sense a test signal to detect cracks in all or some circuits of the panel.

Figure 12:
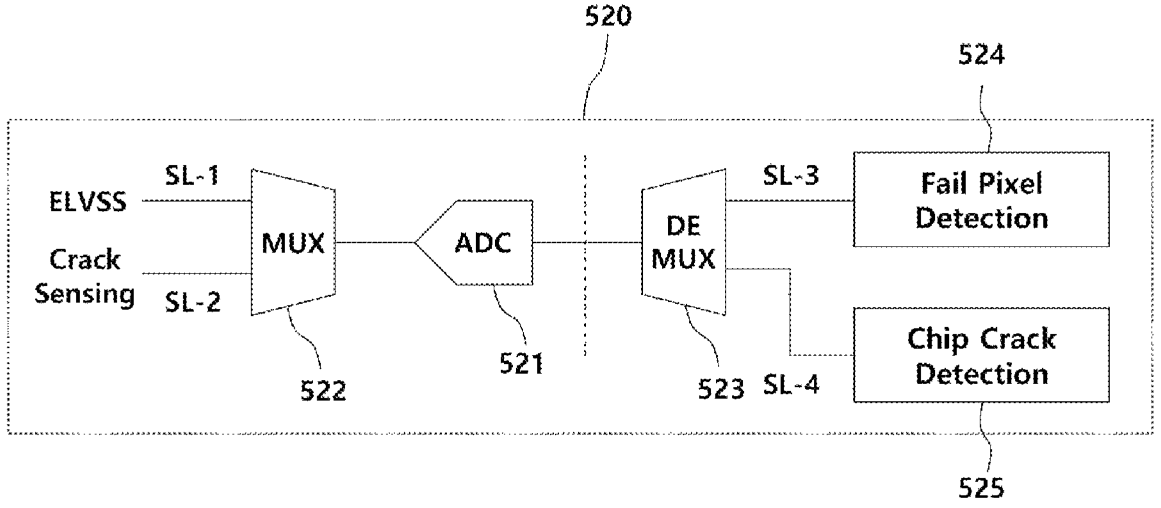
FIG. 12 is a third example configuration diagram of a data driving device according to an embodiment.

FIG. 12 is a third example configuration diagram of a data driving device according to an embodiment.

Referring to FIG. 12, the data driving device 520 can comprise an analog-to-digital converter 521, a multiplexer 522, a demultiplexer 523, etc.

The data driving device 520 can sense the operating current of the pixel circuit driving the LED in the first time section through the first sensing line (SL-1).

The data driving device 520 can sense a crack test signal of the panel on which the pixel circuit is arranged in a second time section through the second sensing line (SL-2). A separate device can be required to transmit and sense the crack test signal of the panel, but if the multiplexer 522 is included in the data driving device 520, the data driving device 520 does not require a separate device, but when the multiplexer 522 is included in the data driving device 520, cracks in the panel can be detected through calculations within the data driving device 520 without the need for a separate device, making it possible to miniaturize the integrated circuit.

The multiplexer 522 can select and output the operating current of the first sensing line in the first time section and select and output the crack test signal of the second sensing line in the second time section.

The analog-to-digital converter 521 can receive the output signal of the multiplexer 522 and convert it into digital data. To detect cracks in a panel or chip, a separate device can be used or a separate analog-to-digital converter can be used, but the analog-to-digital converter 521 for low-power driving sensing ca commonly be used in the data driving device 520. In addition, the defective pixel detection and chip crack detection functions can be integrated and performed by the multiplexer 522 and demultiplexer 523 located before and after the analog digital converter 521.

The defective pixel detection circuit 524 can determine whether the LED operation of the pixel is normal and its location.

The chip crack detection circuit 525 can detect whether chips disposed on the panel are cracked.

The data driving device 520 can be connected to the output terminal of the analog-to-digital converter 521, and can comprise a demultiplexer 523 that transmits pixel current data to the defective pixel detection circuit 524 in the first time section and transmits crack test data to the chip crack detection circuit 525 in the second time section.

The demultiplexer 523 can selectively transmit the digital value output by the analog-to-digital converter 521 to the defective pixel detection circuit 524 or the chip crack detection circuit 525.

The defective pixel detection circuit 524 or the chip crack detection circuit 525 can be a circuit that performs a logical operation using a digital signal transmitted by the third sensing line (SL-3) or the fourth sensing line (SL-4) or a circuit that performs the function of a processor.

If the first LED of the pixel circuit is determined to be defective, the data driving device 520 can block the current flowing to the first LED, supply current only to the second LED, and store the location information of the pixel in a register, etc.

The data driving device 520 can comprise a pixel current sensing circuit (not shown) that determines whether a pixel is defective based on pixel current data transmitted by the demultiplexer 523 in the first time section. The pixel current sensing circuit can determine that the pixel is defective when the pixel current data is outside the normal range.

According to the embodiment, it can be applied to wafer test equipment without separate optical equipment and can be added to an existing wafer level test program.

In addition, according to the embodiment, the defective pixel location information can be immediately stored in OTP, etc., and the use of redundancy can be reflected.

In addition, according to the embodiment, it is possible to recheck defective pixels in which the redundancy settings are reflected.

In addition, according to the embodiment, no additional increase in chip size can occur due to using a circuit embedded in an existing data driving device.

Figure 13:
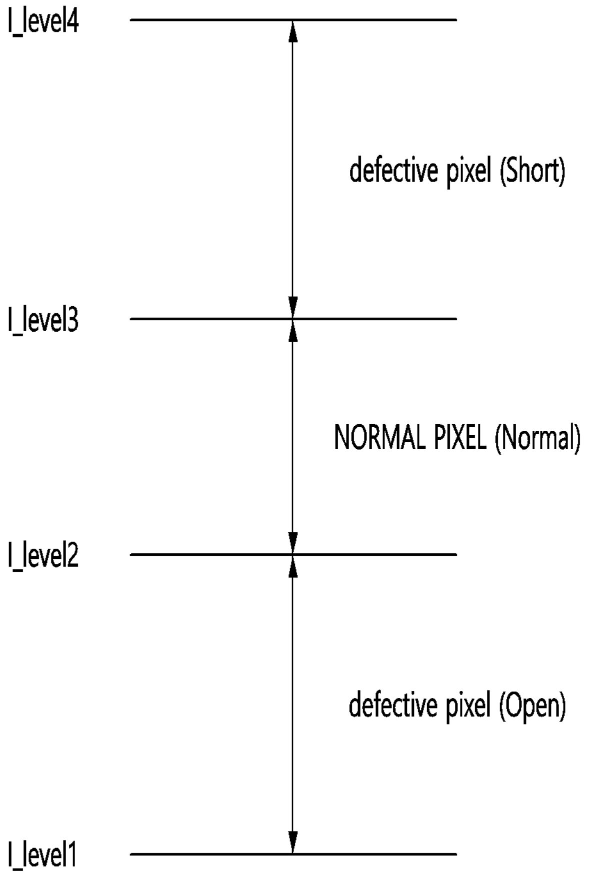
FIG. 13 is a diagram illustrating the intensity range of the normal operating current of the pixel circuit according to an embodiment.

FIG. 13 is a diagram illustrating the intensity range of the normal operating current of the pixel circuit according to an embodiment.

Referring to FIG. 13, the data driving device can sense the output signal of the pixel circuit and determine whether the pixel circuit is operating normally.

The level of the output signal of the pixel circuit can be within a range set as the first to fourth levels I_level1, I_level2, I_level3 and I_level4. In this case, the current intensity in the first to second levels can be determined to be a defective pixel, that is, open, and the current intensity in the second to third levels can be determined to be a normal pixel. The current intensity in the third to fourth levels can be determined to be a defective pixel, that is, a short circuit. In other words, if a high current compared to the normal range is sensed, it is judged as a short circuit, and if a low current is sensed, it is judged as open such that it can be determined that a defective pixel exists in the corresponding line.

FIG. 14 is a diagram illustrating a horizontal defective pixel scanning method according to an embodiment.

FIG. 15 is a diagram illustrating a vertical defective pixel scanning method according to an embodiment.

Figure 16:
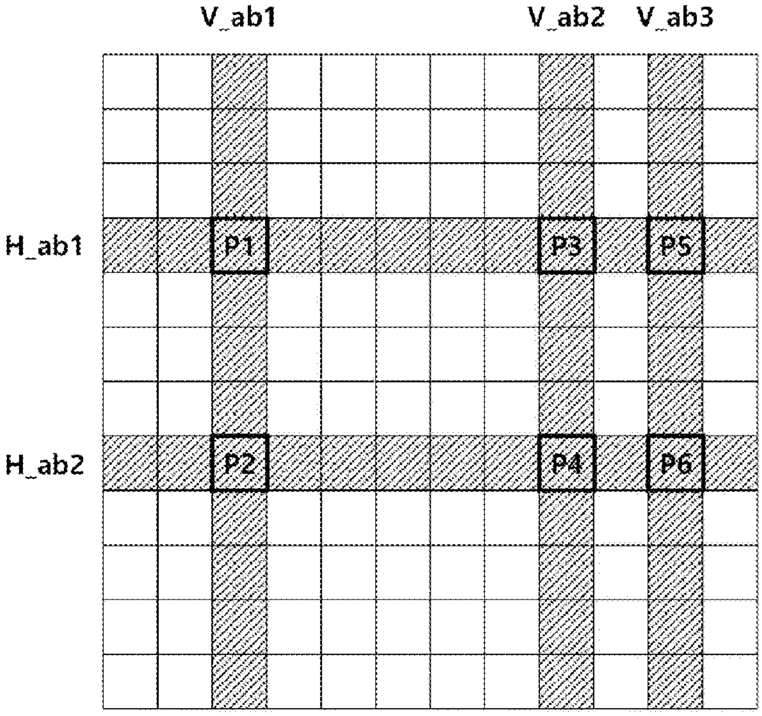
FIG. 16 is a diagram illustrating a method for detecting defective pixels according to an embodiment.

FIG. 16 is a diagram illustrating a method for detecting defective pixels according to an embodiment.

The two-dimensional coordinates and location of the defective pixel can be determined by the combination of each line determined by the vertical line and horizontal line.

Referring to FIG. 14, it is possible to search for a line where a defective pixel exists by sequentially turning on and off the LEDs of the pixels in the horizontal direction. If the operating current or operating voltage output by the pixel circuit is outside the reference range, it can be judged as a defective pixel.

Referring to FIG. 15, the LEDs of vertical pixels can be sequentially turned on and off to search for lines where defective pixels exist.

Referring to FIG. 16, it is possible to search for pixels P1 to P6 in which defects occur due to a combination of defects in the horizontal pixel circuit and defects in the vertical pixel circuit.

Figure 17:
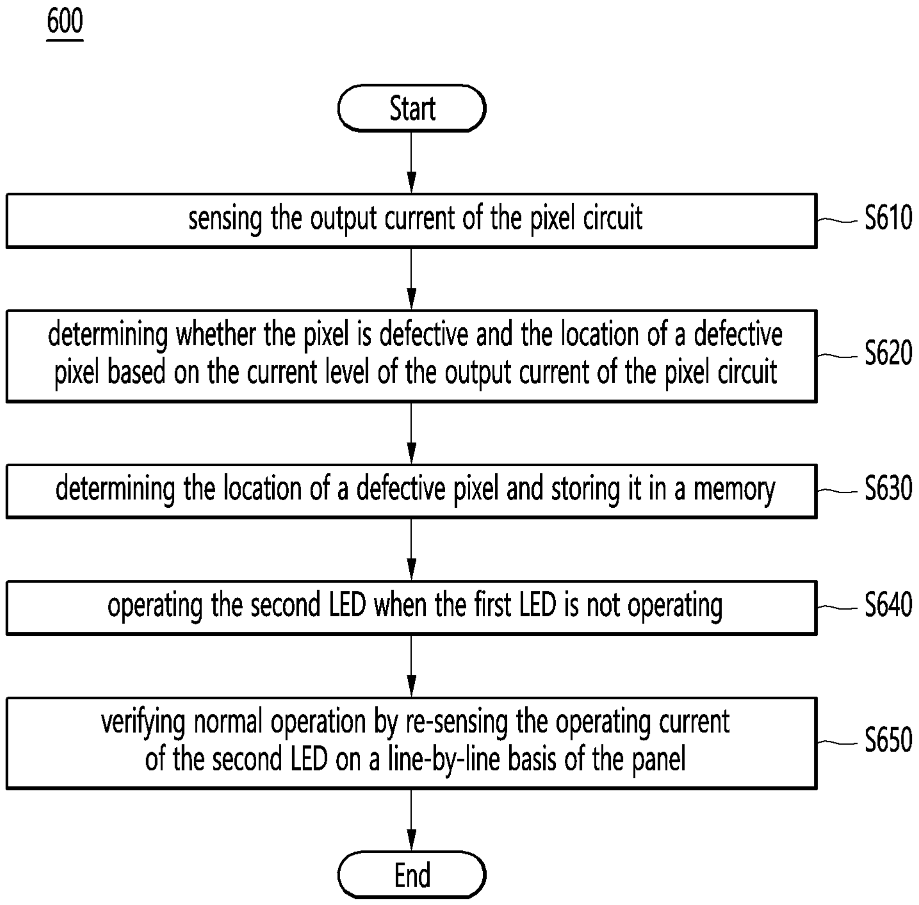
FIG. 17 is a flowchart of a method for detecting defective pixels according to an embodiment.

FIG. 17 is a flowchart of a method for detecting defective pixels according to an embodiment.

Referring to FIG. 17, the display driving method 600 can perform the defective pixel detection method in order.

The display driving method 600 can comprise the step (S610) of supplying a first driving voltage and a second driving voltage to a pixel circuit that comprises a first LED and a second LED through a data driving device, and sensing the output current of the pixel circuit.

Through the analog-to-digital converter of the data driving device, the operating current of the first LED or second LED can be sensed on a line-by-line basis of the panel and obtained and calculated as digital data.

The data driving device can supply a second driving voltage to the pixel circuit and selectively sense the output current of the pixel circuit through the line of the second driving voltage supplied with the second driving voltage. The data driving device can supply the second driving voltage by selectively connecting the line of the second driving voltage through a switch in a first time section, and selectively connects the line of the second driving voltage through a switch in a second time section to sense the output current the pixel circuit.

The display driving method 600 can comprise the step (S620) of determining whether the pixel is defective and the location of a defective pixel in the first LED or the second LED based on the current level of the output current of the pixel circuit.

The output current of the pixel circuit can be transmitted through a second driving voltage line of the data driving device that supplies the second driving voltage. Additionally, the data driving device can convert the output current of the pixel circuit into a digital value through an analog-to-digital converter, search for the location of a defective pixel, or detect cracks in the panel.

The data driving device can determine that the pixel is defective when the output current of the pixel circuit obtained in the second time section is outside the reference range.

The display driving method 600 can comprise the step (S630) of determining the location of a defective pixel in the panel and storing it in a memory, etc.

The display driving method 600 can comprise the step (S640) of operating the second LED when the first LED is not operating. In the step (S640), the second LED can be driven by supplying an LED control signal to the second LED.

The data driving device can drive the first LED by maintaining the first LED control signal in a high state when the output current of the pixel circuit is in the normal range, and the data driving device can drive the second LED by maintaining the second LED control signal in a high state when the output current of the pixel circuit is in the abnormal range.

The pixel circuit can comprise a first path circuit and a second path circuit. The first path circuit can comprise a first transistor and a second transistor disposed between a line of a first driving voltage and a line of a second driving voltage. The second path circuit can comprise a third transistor, a fourth transistor and a first LED disposed between a line of a first driving voltage and a line of a second driving voltage, and a fifth transistor, a sixth transistor and a second LED arranged in parallel with the third transistor, the fourth transistor and the first LED.

The display driving method 600 can comprise the step (S650) of verifying normal operation by re-sensing the operating current of the second LED on a line-by-line basis of the panel.

Figure 18:
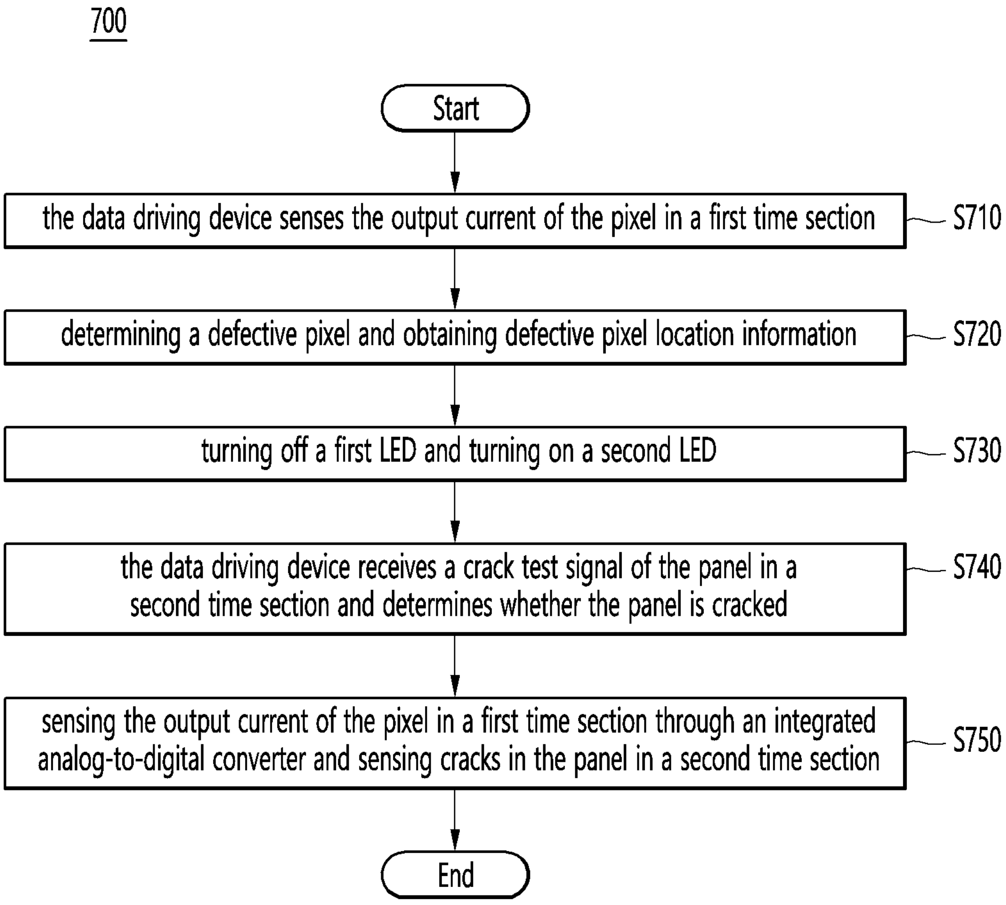
FIG. 18 is a flowchart of a defective pixel detection and panel crack detection method according to an embodiment.

FIG. 18 is a flowchart of a defective pixel detection and panel crack detection method according to an embodiment.

Referring to FIG. 18, as the display driving method 700, the defective pixel detection and panel crack detection methods can be performed in order.

The display driving method 700 can comprise the step (S710) in which the data driving device senses the output current of the pixel in a first time section.

The display driving method 700 can comprise the step (S720) of determining a defective pixel and obtaining defective pixel location information.

The display driving method 700 can comprise the step (S730) of turning off a first LED and turning on a second LED.

The display driving method 700 can comprise the step (S740) in which the data driving device receives a crack test signal of the panel in a second time section and determines whether the panel is cracked. In a data driving device, signal sensing of the first time section and the second time section can be performed through individual signal lines connected by a multiplexer. Here, the first time section is the time section of pixel circuit sensing, and the second time section is the time section of the panel crack, which can be a discontinuous individual time section.

The display driving method 700 can comprise the step (S750) of sensing the output current of the pixel in a first time section through an integrated analog-to-digital converter (ADC) and sensing a test signal for determining cracks in the panel in a second time section.

The display driving method 700 can be performed in a data driving device that integrates a function of determining pixel defect and a function of determining panel crack.

What is claimed is:

1. A data driving device, comprising:

a first sensing line electrically connected to a pixel circuit on a panel to receive an operating current of the pixel circuit;

a second sensing line electrically connected to the panel to receive a crack test signal;

a multiplexer connected to the first sensing line and the second sensing line to select and output one of the operating current which is received through the first sensing line at a first time section and the crack test signal which is received through the second sensing line at a second time section;

an analog-to-digital converter connected to the multiplexer and configured to convert the operating current into pixel current data or convert the crack test signal into crack test data; and a demultiplexer connected to the analog-to-digital converter to output the pixel current data to a defective pixel detection circuit at the first time section and output the crack test data to a crack detection circuit at the second time section, wherein the pixel circuit includes a first LED and a second LED, wherein the data driving device is configured to determine a defective pixel and obtain defective pixel location information based on the operating current received through the first sensing line at the first time section, and wherein when the defective pixel is determined, the data driving device is further configured to turn off the first LED and turn on the second LED before the second time section.

2. The data driving device of claim 1, wherein the data driving device is configured to supply a first driving voltage and a second driving voltage to selectively emit light in the first LED or the second LED included in the pixel circuit.

3. The data driving device of claim 1, wherein the data driving device is configured to scan a plurality of pixel circuits arranged on the panel line by line and detect the location of a defective pixel by sensing an output current of a corresponding pixel circuit.

4. The data driving device of claim 1, wherein the second sensing line is a signal line separated from a line of a driving voltage.

5. The data driving device of claim 1, wherein when the operating current of the pixel circuit which is obtained through the first sensing line and which is associated with the first LED is out of a reference range, the data driving device is configured to determine that the first LED of the pixel circuit is defective, does not supply a driving current to the first LED, and supply the driving current to the second LED.

6. The data driving device of claim 1, wherein the pixel circuit comprises:

a first path circuit comprising a first transistor and a second transistor disposed between a line of a first driving voltage and a line of a second driving voltage; and a second path circuit comprising a third transistor, a fourth transistor, the first LED, a fifth transistor, a sixth transistor, and the second LED, the third transistor, the fourth transistor, and the first LED are disposed between the line of the first driving voltage and the line of the second driving voltage, the fifth transistor, the sixth transistor, and the second LED are disposed in parallel with the third transistor, the fourth transistor, and the first LED, and the pixel circuit is configured to selectively emit light in one of the first LED and the second LED.

7. The data driving device of claim 1, wherein the multiplexer is electrically connected to an input of the analog-to-digital converter, the multiplexer is configured to receive the operating current and the crack test signal via the first and second sensing lines, the multiplexer is configured to select one of the operating current and the crack test signal and output the selected one of the operating current and the crack test signal to the input of the analog-to-digital converter at the first time section via a single line connected between the multiplexer and the analog-to-digital converter, and the multiplexer is configured to select another one of the operating current and the crack test signal and output the selected another one of the operating current and the crack test signal to the input of the analog-to-digital converter at the second time section that is different from the first time section via the single line connected between the multiplexer and the analog-to-digital converter.

8. The data driving device of claim 7, wherein the demultiplexer is electrically connected to an output of the analog-to-digital converter, the demultiplexer is configured to receive, from the analog-to-digital converter, the pixel current data and the crack test data at different time sections via a single line connected between the analog-to-digital converter and the demultiplexer, the demultiplexer is electrically connected to a defective pixel detection circuit and a chip crack detection circuit, the demultiplexer is configured to select the defective pixel detection circuit from among the defective pixel detection circuit and the chip crack detection circuit and output the pixel current data to the selected defective pixel detection circuit, and the demultiplexer is configured to select the chip crack detection circuit from among the defective pixel detection circuit and the chip crack detection circuit and output the crack test data to the selected chip crack detection circuit.

9. A method performed by a data driving device, the method comprising:

receiving an operating current of a pixel circuit on a panel via a first sensing line electrically connected to the pixel circuit;

receiving a crack test signal via a second sensing line electrically connected to the panel;

using a multiplexer connected to the first sensing line and the second sensing line, selecting and outputting one of the operating current which is received through the first sensing line at a first time section and the crack test signal which is received through the second sensing line at a second time section;

using an analog-to-digital converter connected to the multiplexer, converting the operating current into pixel current data or converting the crack test signal into crack test data; and using a demultiplexer connected to the analog-to-digital converter, outputting the pixel current data to a defective pixel detection circuit at the first time section and outputting the crack test data to a crack detection circuit at the second time section, wherein the pixel circuit includes a first LED and a second LED, wherein the method further comprises:

determining a defective pixel and obtain defective pixel location information based on the operating current received through the first sensing line at the first time section, and when the defective pixel is determined, turning off the first LED and turning on the second LED before the second time section.

10. The method of claim 9, wherein the multiplexer is electrically connected to an input of the analog-to-digital converter, and the method comprises receiving at the multiplexer the operating current and the crack test signal via the first and second sensing lines;

selecting at the multiplexer one of the operating current and the crack test signal;

outputting from the multiplexer the selected one of the operating current and the crack test signal to the input of the analog-to-digital converter at the first time section via a single line connected between the multiplexer and the analog-to-digital converter;

selecting at the multiplexer another one of the operating current and the crack test signal; and outputting from the multiplexer the selected another one of the operating current and the crack test signal to the input of the analog-to-digital converter at the second time section that is different from the first time section via the single line connected between the multiplexer and the analog-to-digital converter.

11. The method of claim 10, wherein the demultiplexer is electrically connected to an output of the analog-to-digital converter, the demultiplexer is electrically connected to a defective pixel detection circuit and a chip crack detection circuit, and the method comprises:

receiving at the demultiplexer, from the analog-to-digital converter, the pixel current data and the crack test data at different time sections via a single line connected between the analog-to-digital converter and the demultiplexer;

selecting at the demultiplexer the defective pixel detection circuit from among the defective pixel detection circuit and the chip crack detection circuit;

outputting from the demultiplexer the pixel current data to the selected defective pixel detection circuit;

selecting at the demultiplexer the chip crack detection circuit from among the defective pixel detection circuit and the chip crack detection circuit;

outputting from the demultiplexer the crack test data to the selected chip crack detection circuit.

* * * * *